(12) United States Patent
Viswanadham et al.

(10) Patent No.: US 6,424,659 B2
(45) Date of Patent: *Jul. 23, 2002

(54) MULTI-LAYER SWITCHING APPARATUS AND METHOD

(75) Inventors: Krishna Viswanadham, Mountain View; Mahesh Veerina, Sunnyvale, both of CA (US)

(73) Assignee: Network Equipment Technologies, Inc., Fremont, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/118,458

(22) Filed: Jul. 17, 1998

(51) Int. Cl.$^7$ ................................ H04J 3/16; H04J 3/22

(52) U.S. Cl. ........................................ 370/469; 370/389

(58) Field of Search ................................ 370/469, 463, 370/395, 396, 397, 412, 413, 414, 415, 416, 417, 418, 419, 359, 392, 229, 230, 465, 471, 428, 389

(56) References Cited

U.S. PATENT DOCUMENTS

| | | | | |
|---|---|---|---|---|
| 4,821,265 A | | 4/1989 | Albal et al. | 370/469 |
| 4,949,338 A | | 8/1990 | Albal et al. | 370/462 |
| 5,357,504 A | | 10/1994 | Siegmund | 370/469 |
| 5,408,464 A | * | 4/1995 | Jurkevich | 370/219 |
| 5,581,552 A | * | 12/1996 | Civanlar et al. | 370/396 |
| 5,600,644 A | * | 2/1997 | Chang et al. | 370/404 |
| 5,805,072 A | * | 9/1998 | Kakemizu | 340/825.03 |
| 5,889,778 A | * | 3/1999 | Huscroft et al. | 370/395 |
| 5,909,686 A | * | 6/1999 | Muller et al. | 707/104 |
| 5,926,482 A | * | 7/1999 | Christie et al. | 370/469 |
| 5,938,736 A | * | 8/1999 | Muller et al. | 709/243 |
| 6,016,310 A | * | 1/2000 | Muller et al. | 370/255 |
| 6,021,132 A | * | 2/2000 | Muller et al. | 370/412 |
| 6,067,608 A | * | 5/2000 | Perry | 711/203 |

* cited by examiner

Primary Examiner—Alpus H. Hsu
Assistant Examiner—Brian Nguyen
(74) Attorney, Agent, or Firm—Crosby, Heafey, Roach & May

(57) ABSTRACT

Multilayer switching device and associated technique enables simultaneous wire-speed routing at OSI layer 3, wire-speed switching at layer 2, and support multiple interfaces at layer 1. Implementation may be embodied using one or more integrated circuits (ASIC), RISC processor, and software, thereby providing wire-speed performance on interfaces, in various operational modes.

17 Claims, 25 Drawing Sheets

MULTI-LAYER SWITCHING APPARATUS AND METHOD

FIELD OF INVENTION

Invention relates to digital networks, particularly to multi-layer switching network apparatus and method.

BACKGROUND OF INVENTION

Conventional local area network (LAN) and TCP/IP have become dominant technologies in computer networking. As businesses increasingly rely on such technologies, both LAN size and TCP/IP traffic volume that runs across them have grown dramatically. This has led the network manager on continuous search for products to increase network performance, easily adapt to changing network requirements, and preserve existing network investment.

Presently, LAN technology is evolving into Gigabit per second (Gbps) range. Equipment designers have been challenged to make network interfaces and networking products such as bridges, routers, and switches, fast enough to take advantage of the new performance. Compounding the equipment design problem has been the rapid innovation in networking protocols. The traditional response to this shifting sands problem has been to build easily upgradable software-intensive products. Unfortunately, these software intensive products typically exhibit poor system performance.

Accordingly, there is need for a new generation of internetworking devices capable of gigabit speeds, but with the flexibility of previous software intensive products.

SUMMARY OF INVENTION

Invention resides in a multilayer switching device and associated technique for enabling simultaneous wire-speed routing at layer 3, wire-speed switching at layer 2, and support multiple interfaces at layer 1, according to OSI reference model. Inventive implementation may be embodied using one or more integrated circuits (ASIC), RISC processor, and software, thereby providing wire-speed performance on interfaces, in various operational modes.

DETAILED DESCRIPTION

Figure 1:
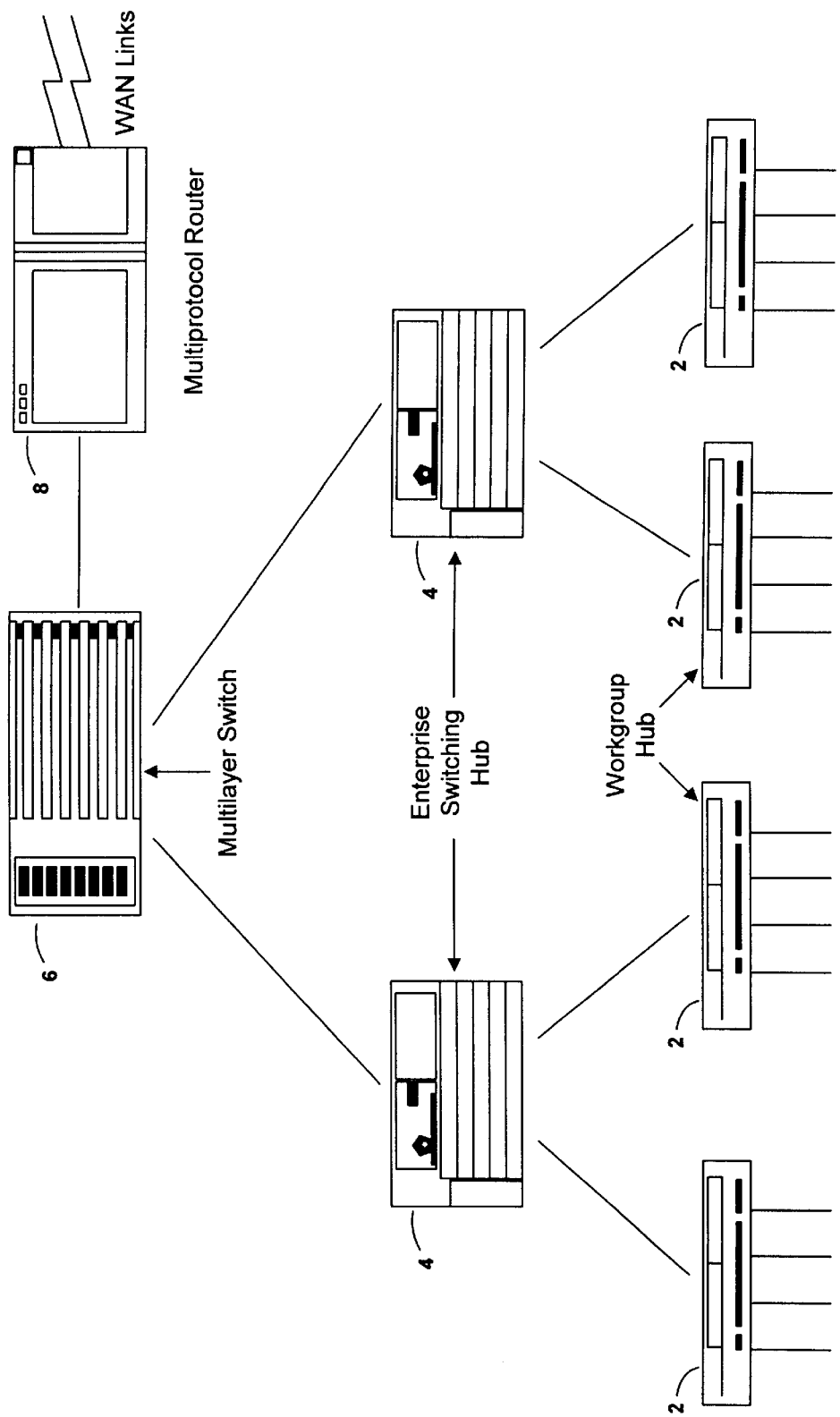
FIG. 1 is system-level diagram of preferred embodiment.

FIG. 1 is top-level overview diagram of system architecture for preferred embodiment. Multilayer switch device 6 couples local area network (LAN) workgroup hubs 2 through enterprise switching hub 4 to wide-area network (WAN) links through multiprotocol router 8. Multilayer switch 6 and associated technique enables simultaneous wire-speed routing at Layer 3 (L3), wire-speed switching at Layer 2 (L2), and support multiple interfaces at Layer 1 (L1), according to OSI reference model. System may be embodied using one or more integrated circuits (ASIC), RISC processor, and software, thereby providing wire-speed performance on various interfaces in various operational modes.

System architecture comprises two-level distributed multilayer switch, preferably using 4-Gbps non-blocking switch fabric 6. Multilayer (i.e., both L2 and L3) switch fabric is entirely contained within single ASIC capable of switching 3M pps or more. A 4 Gbps I/O bus connects one or more interface modules to the ASIC. Because the switch matrix is not necessarily integrated with the MAC layer, a wide range of interface types can be supported (i.e., both LAN and WAN). Using present embodiment, various combinations of layer 1 interfaces are supportable, and all interface modules are field-upgradable. Various interface modules may carry multiple physical interfaces.

Figure 2A:
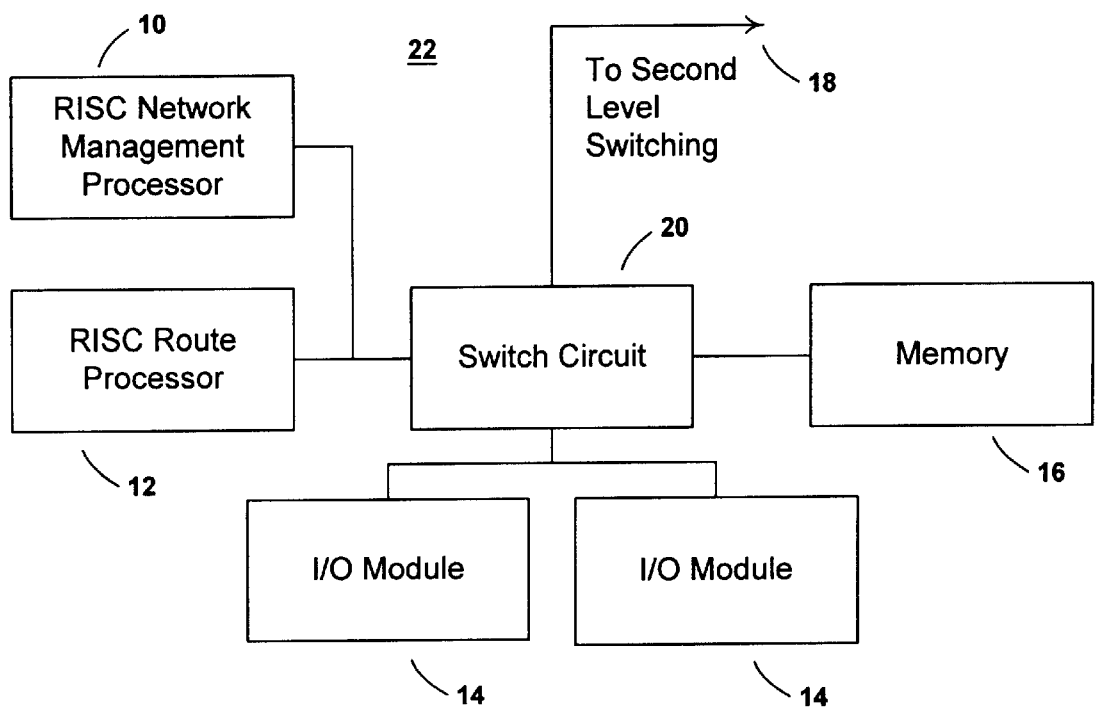
FIGS. 2A–B are block diagrams of first- and second-level switch respectively of present embodiment.

As shown in FIG. 2A, first-level switch 22 includes switch ASIC 20, which couples RISC coprocessors (i.e., Network Management Processor (NWP) 10 and Route/Switch (RS) processor 12,) for supporting for higher-layer software functions and support features. Optional components may be added for redundancy of critical system components, such as power supplies. Memory 16 and input/output (I/O) modules 14 couple to switch circuit 20.

Figure 2B:
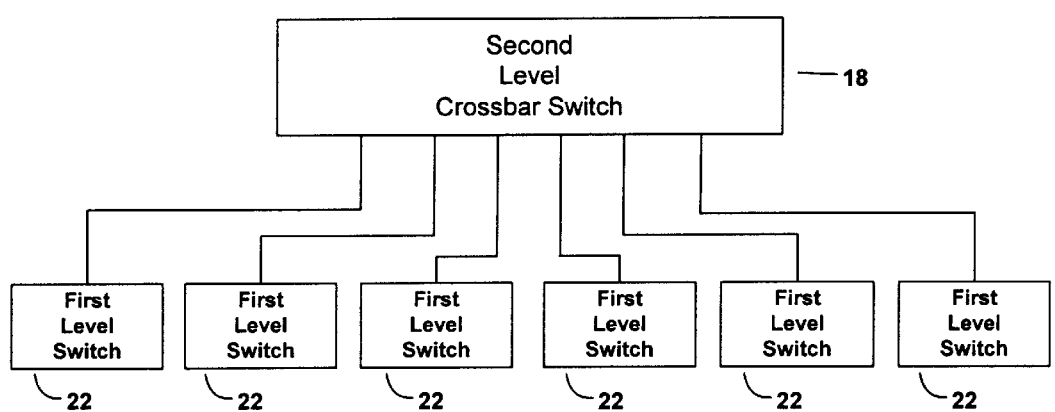

In FIG. 2B, second-level switch or cross-bar interconnection 18 couples multiple first-level switches 22. For example, in configuration shown with six first-level switches 22, aggregate performance of non-blocking switch fabric may exceed 24 Gbps.

RISC processors 10, 12 provided in each switch element 22 execute software to provide standards-based dynamic routing, and non-real time activities such as network management. Software is stored in flash memory, and is network-updatable via TFTP. Preferred software functions include: dynamic Internet Protocol (IP) routing (e.g., RIP, RIPv2, OSPF); layer 2 support (e.g., 802.1D STP); configuration support (e.g., enable/disable Layer 2 or Layer 3 support on per-port basis; ports can be grouped into broadcast domains, flexible subnet configuration); network management: (e.g., SNMP, HTML, Telnet, TFTP, DHCP support).

Additional software functions include: quality-of-service provisioning (QOS) (e.g., providing multiple levels of prioritization, address- and policy-based QOS, dynamic layer 3, QOS based on RSVP); IP Multicast (e.g., IGMP, DVMRP); network traffic monitoring (e.g., RMON); hot standby support (e.g., VRRP); additional dynamic routing (e.g., NHRP); and certain IEEE enhancements (e.g., 802.1Q (i.e., VLAN), 802.3x (i.e., flow control), and 802.1p (i.e., priority)).

Present multi-layer switch approach offloads multiprotocol router 8 of local IP routing, thereby leaving router 8 with bandwidth for routing other protocols, and for handling WAN links. Hence, existing investment in router 8 may be preserved, for example, without changes to WAN topology. Further, effective performance at network apex is wire speed, and enterprise switching hubs 4 at network apex may be segmented, thereby preserving bandwidth, and extending useful life. Additionally, with present system architecture, installation therein of network products and applications is comparatively easier, particularly because addressing changes are incremental, thereby minimizing impact on network operations. Moreover, preferred system not use non-standard protocols, thereby assuring interoperability in multi-vendor environment.

Although present multilayer switch system is suitable for applications at network aggregation points, present system may also be used in high-performance workgroup and server applications. For example, in high-performance workgroup application, present system may interconnect between cluster of closely cooperating high performance computers, such as in video postproduction, where ability to transfer data rapidly between workstations is critical to production throughput. In such case, wire-speed performance is interesting, and flexible layer 3-addressing support provides connections outside workgroup, without impacting switching speed. Additionally, in case of server applications, present multilayer switch system provides network attachment point for one or more servers. Wire-speed performance of present system allows network designer to use either layer 2 or layer 3 topologies, and removes potential network performance bottleneck.

Moreover, as described in further detail hereunder, preferred implementation of innovative multilayer switch apparatus and methodology provides following functionality: support for 16 or more full-duplex 100BaseT ports or up to 28 ports of 10/100BaseT ports; direct interface to MIPS-type RISC processor for management and routing; integration of SDRAM controller for shared high-speed 6-channel packet memory; integrates of CAM access interface to system processor; integration of hardware CAM processor for L2 learning, lookup and live interactive activities or transactions; integration of hardware hash-based IP header lookup and management; integration of hardware-based transmit and free queue management; integration of L2 and L3 forwarding of unicast, broadcast and multicast packets; broadcast traffic management; integration of QoS, with 4 priority queues per port; hardware-handled packet movement; integration of 768 bytes of dual-port memory for L2 and L3 header for 28 ports; support for 4 MB/16 MB of SDRAM packet memory; implementation of 256 bytes of data buffers for concurrent transfers to PM SDRAM and LAN bus; intelligent buffer scheduler & arbiter for efficient bandwidth distribution; low-latency mode, store and forward mode selection, with 10-us switching latency; operation of LAN bus at 64-bit/66-Mhz; operation of packet memory bus at 32-bit/100-Mhz; operation of processor bus at 32-bit/66-Mhz; operation of control memory and L2 CAM interfaces at 16-bit/66-Mhz; operation of router (RT) cache SDRAM interface at 16-bit/66-Mhz.

Preferably, multilayer switch circuit 20 is implemented as single-chip integrated circuit (e.g., semicustom ASIC) for processing handles switching of any canonical packet, cell, frame, or other data communication element, with no or limited processing assistance from external processors. Switch circuit 20 operates in relatively low latency, and store-and-forward switching modes. Transactions between Ethernet ports may operate in low-latency cut-thru mode; other transactions may occur in store-and-forward mode.

As appropriate, switch circuit 20 may contain substantially one or more of following functions: external bus interface, processor interface, CAM interface, LAN interface, packet memory (PM) SDRAM interface, route cache SDRAM interface, control memory (CM) SRAM interface, LAN block, LAN bus arbiter, LAN bus controller, LAN block interfaces, data path block, data path buffers, data path controller, buffer scheduler, packet memory, packet memory SDRAM arbiter and controller, DMA function-to-processor interface, packet engine (PE), port control function, port attribute memory, L2 CAM engine, memory blocks for header and CAM analysis result, CAM structures, L2 header analysis hardware engine, auto-forwarding block, forwarding block, L3 header analysis result memory, free queue management block, block attributes management, transmit queue management block (XQMB), SRAM arbiter and controller, processor interface, L3 block, L3 header memory, hash function, L3 lookup algorithm, L3 management function, L3 aging function, route cache (RC) SDRAM arbiter and controller, RISC processor interface, slave interface, bus master interface, DMA interface, bus protocol, register interface-to-internal resources, and interrupts.

Figure 3:
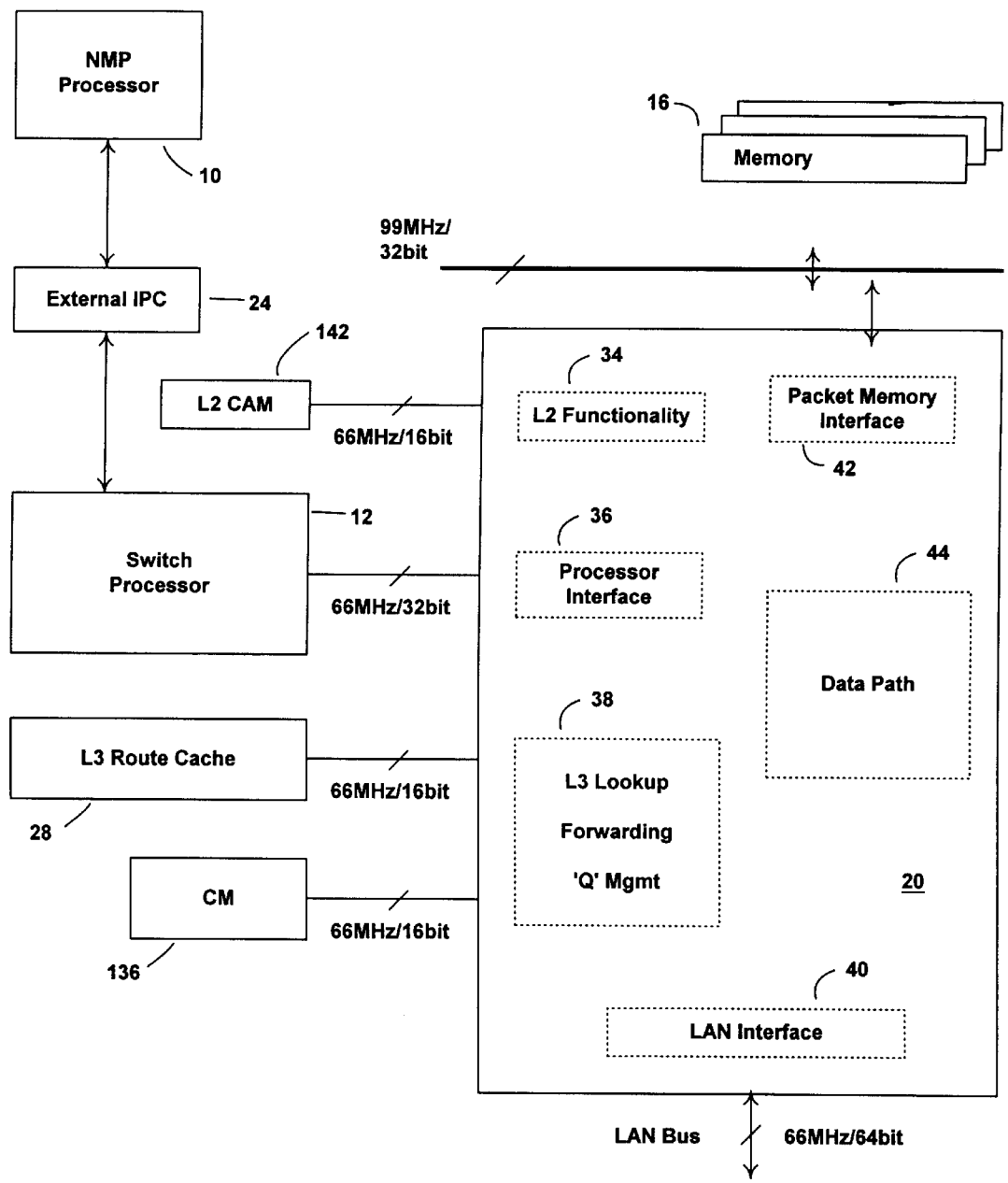
FIG. 3 is general switch block diagram of present embodiment.

In FIG. 3, for example, preferred implementation of switch system shows general logic block diagram for switch circuit 20 coupled to: 64-bit 66 Mhz LAN bus, external memory 16 through 32-bit 99-Mhz bus, L2 CAM through 16-bit 66-Mhz bus, control memory 136 through 16-bit 66-Mhz bus, L3 route cache through 16-bit 66-Mhz bus, and switch processor 12 through 16-bit 66-Mhz bus, which couples to network management processor (NMP) 10 through external interprocessor controller (IPC) 24.

Figure 4:
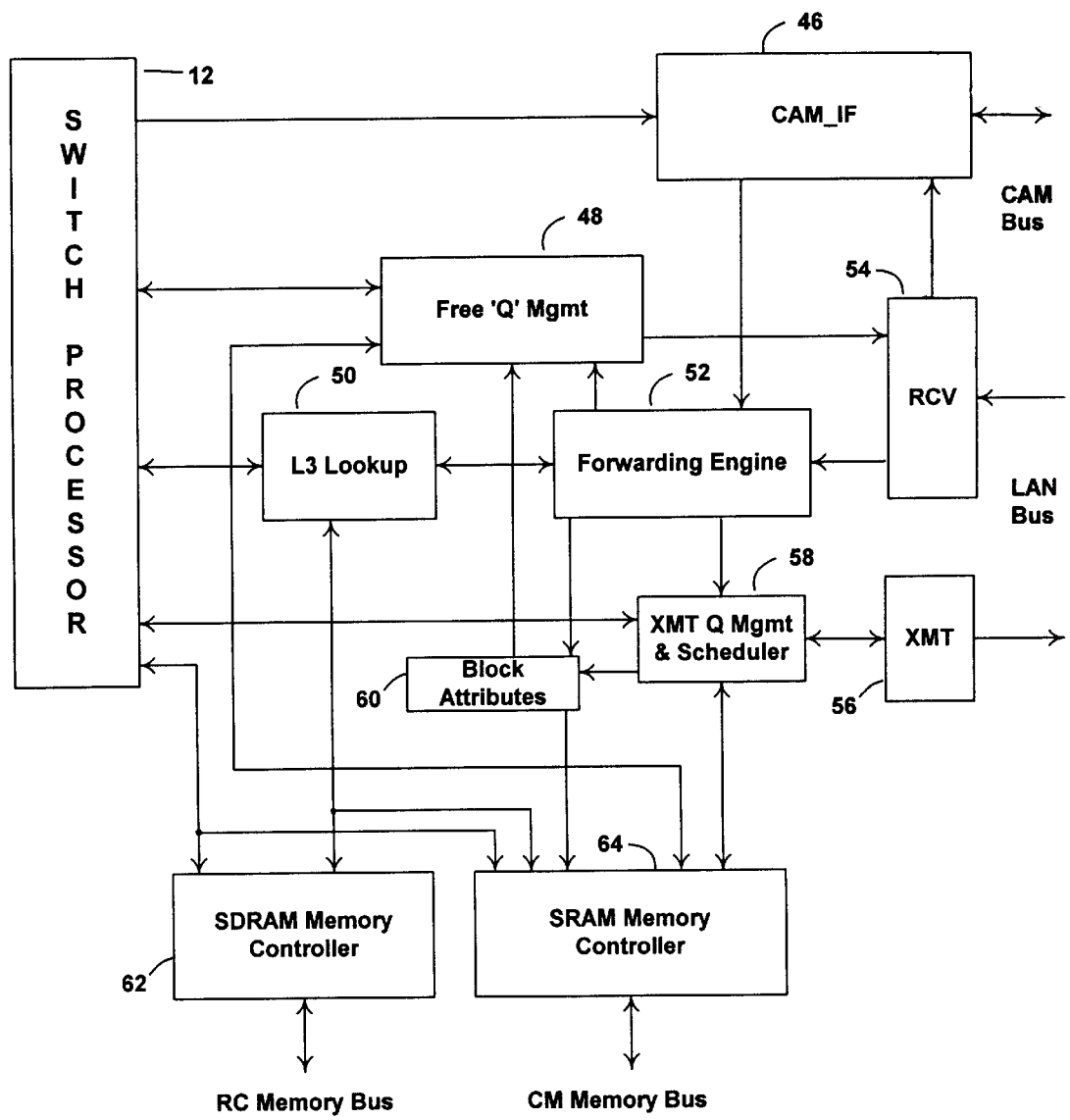
FIG. 4 is general control-path diagram of present embodiment.

In FIG. 4, internal control path of switch circuit 20 is shown. External switch processor 12 couples to CAM interface 46, free queue management 48, L3 lookup 50, transmit queue management and scheduler 58, SDRAM memory controller 62, and SRAM memory controller 64. Also, internal control path includes forwarding engine 52, which couples to CAM interface 46, free queue management 48, L3 lookup 50, block attributes 60, transmit queue management and scheduler 58, and receive block 54. Transmit queue management and scheduler 58 couples to transmit block 56, SRAM memory controller 64, and block attributes 60. Receive block 54 and transmit block 56 couple to LAN bus. CAM interface 46 couple to CAM bus and receive block 54. SRAM memory controller 64 couples to free queue management 48, block attributes 60, L3 lookup 50, and SDRAM memory controller 62. SDRAM memory controller 62 couples to RC memory bus and L3 lookup 50. Block attributes 60 couples to free queue management 48. Forwarding engine 52 couples to receive block 54.

Figure 5:
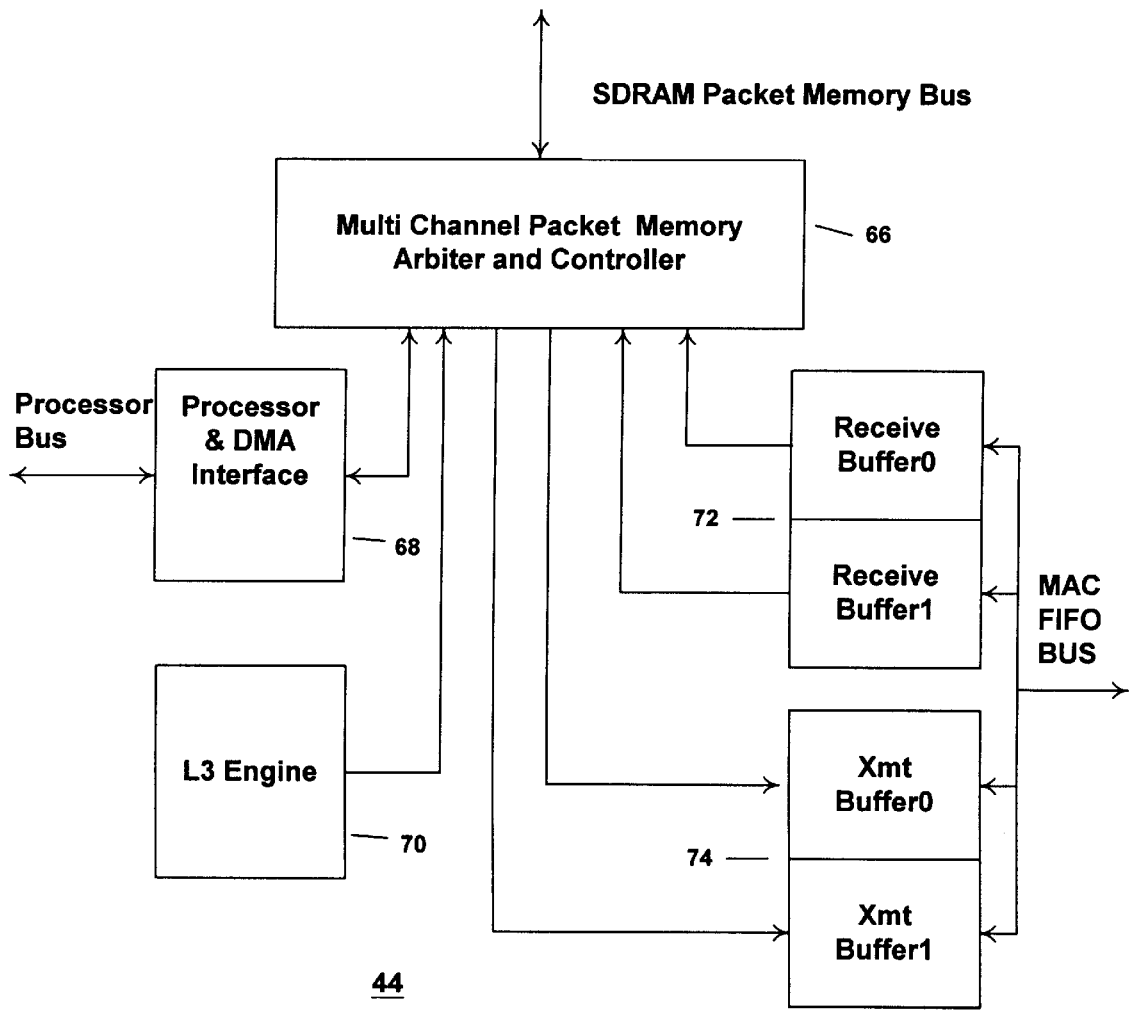
FIG. 5 is general datapath diagram of present embodiment.

In FIG. 5, internal datapath of switch circuit 20 is shown. In particular, multi-channel packet memory arbiter and controller 66 couples to SDRAM packet memory bus, processor and DMA interface 68, L3 engine 70, receiver buffers 72, and transmit buffers 74. Receive and transmit buffers 72, 74 couple to media access controller (MAC) first-in first-out (FIFO) bus. Processor and DMA interface 68 couples to processor bus.

Switch circuit 20 includes processor interface 36 which couples to 32-bit MIPS RISC processor multiplexed bus (e.g., NEC R4300). Such processor bus, a 32-bit address/data bus operable up to 66 Mhz, operates in master and slave modes. In slave mode, such processor bus responds to accesses to internal resources, such as registers, CAM 142, Control Memory 136, PM SDRAM and RC SDRAM. In master mode, such bus handles DMA operations to and from PM SDRAM. Such processor bus does not respond to accesses to external resources, but cooperates with external system controller circuit. In master mode, such processor bus may handle DMA to system memory.

Switch circuit 20 includes CAM interface 46, a dedicated 16-bit bus compliant with content-addressable memory (i.e., Music Semiconductor CAM 1480 compatible) operating at 66 Mhz. Such bus may be shared by external interface. For route/switch (RS) processor accesses to CAM memory, special data path is provided through switch circuit 20. Switch circuit 20 generates CAM access timing control on behalf of RS processor 12. Switch circuit 20 learns and looks-up MAC addresses and port numbers through such bus.

Switch circuit 20 includes LAN interface 40 which couples LAN bus, a 64-bit access bus operating at 66 Mhz. Ethernet MAC devices connect to such LAN bus through receive and transmit MAC FIFO bus. Switch circuit 20 generates select signals and control signals for access to external MAC device FIFO bus. Switch circuit 20 reads/writes data in 64-bit single-cycle burst mode. Burst size is 64 bytes. Preferred bandwidth is 4 GB/s at 64-bit/66 Mhz-operation at 64-byte slice size. Ethernet frames are transferred across LAN bus. At end of receive frame, status bytes are read.

Switch circuit 20 includes packet memory (PM) SDRAM interface 42, which includes PM SDRAM bus which operates at 32-bit/99-Mhz standard. Packet memory 16 is directly connected to such bus through registered transceivers. Preferred bandwidth is 400 MB/s at 99-Mhz operation and 64-byte burst mode. Seven-channel arbiter inside switch circuit 20 allows up to 7 agents to access packet memory 16. PM interface supports up to 8 MB of SDRAM in two banks.

Switch circuit 20 includes interface to Route Cache (RC) SDRAM for coupling timing control signals and multiplexed 16-bit bus, which operates in 66-Mhz mode capable of streaming data at 132 MB/sec.

Switch circuit 20 includes interface to Control Memory (CM) SRAM for managing block free queue list, transmit queues, block parameters and L3 CAM aging information. Such interface is 16-bits wide and operates at 66-Mhz. Address and data buses are multiplexed and operate in flow-through and pipelined modes.

Figure 6A:
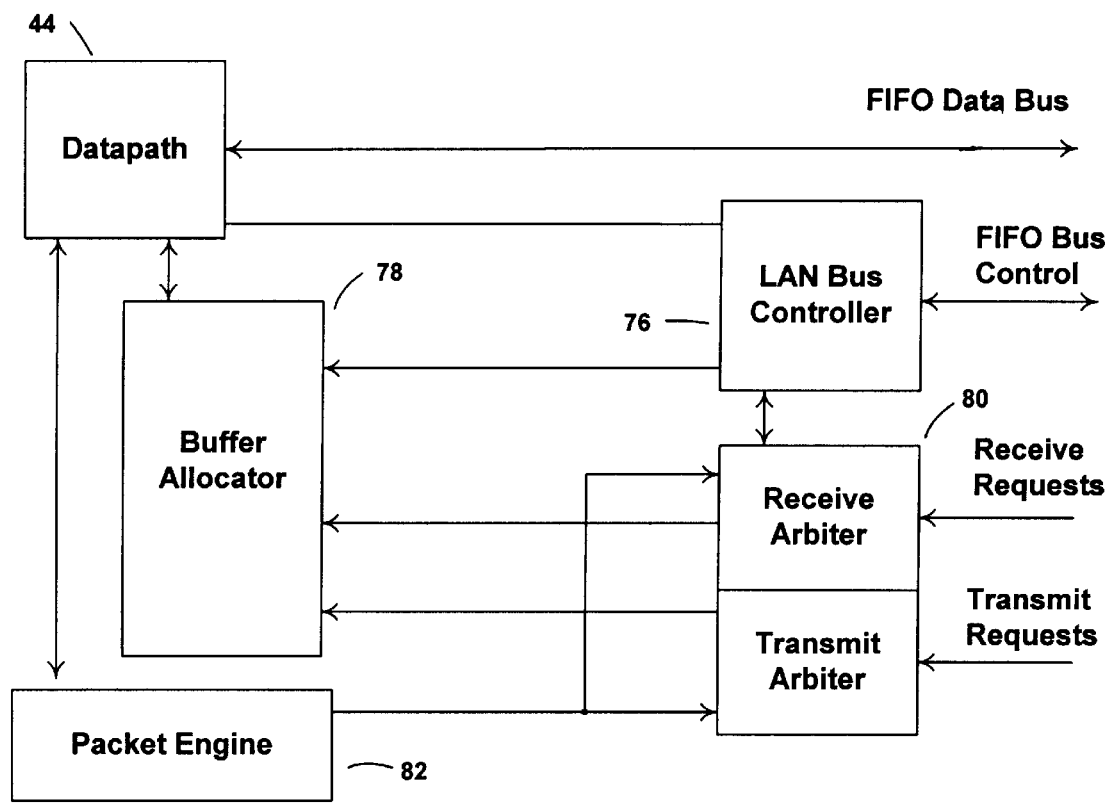
FIGS. 6A–B are block diagrams of LAN interface and datapath interface respectively of present embodiment.

FIG. 6A shows LAN block and interfaces 40 externally to Ethernet Media Access Controller (MAC) FIFO bus and internally to CAM interface block, datapath block 44, and packet engine block 82. LAN block interface functionality include bus arbitration for receive and transmit requests of FIFO bus, bus control and protocol handling, signaling internal datapath block to initiate data transfers and communicating with packet engine to signal begin and end of receive and transmit operations on FIFO bus. As shown, datapath block 44 couples to FIFO data bus, LAN bus controller 76, buffer allocator 78, and packet engine 82. LAN bus controller (LBC) 76 couples to FIFO bus control, buffer allocator 78, and receiver and transmit arbiters 80, which couple to packet engine 82 and receive and transmit requests.

When LAN interface 40 operates, receive requests and transmit requests are multiplexed and fed by external logic. Multiplexer uses 2-bit counter output. Front end demultiplexer reconstructs requests on 32-bit receive request register and 32-bit transmit request register. Few clocks latency for request may be sensed to be activated or deactivated, which may be handled by arbiter mechanism 80.

Receive arbiter 80 services receive port requests, preferably in round-robin scheme for equal distribution. Overlapped processing provides improved performance. Hence, if receive port is under service, next request prioritization occurs in parallel. During arbitration, arbiter 80 may receive port enabled, free block allocated signals from other modules. Upon certain channel winning arbitration, internal receive buffer is allocated 78, and data staged from MAC FIFO bus for packet memory 16. When buffer is granted, channel is presented to LAN Bus controller 76 for data transfer.

Additionally, transmit arbiter 80 services transmit port requests in round-robin scheme for equal distribution. Overlapped processing provides improved performance. Hence, when transmit port is under service, next request is prioritized in pipeline. During arbitration, arbiter 80 may receive port enabled, valid packet assigned, in link mode the transmitter has at least one slice signals from other modules. If channel has data slice in datapath 44, channel is not allowed to join arbitration until data is put into packet memory 16, thereby preventing out-of-sequence data transfer. Upon channel winning arbitration, it is presented to buffer allocator block 78 to obtain internal transmit buffers for staging from packet memory 16 for MAC FIFO bus. Once transmit request wins arbitration, and transmit buffer is allocated, channel is presented to packet engine block 82 to obtain data from packet memory 16. Once data is staged in transmit buffer, buffer requests to LAN Bus controller 76 to transfer data in transmit buffer to MAC FIFO bus.

LAN bus controller 76 provides access to MAC FIFO bus targeted to port moving slice between MAC FIFO and internal data buffers. Receive request, which wins receive arbitration and secures one of receive buffers from buffer allocator 78 and transmit buffers having data for transfer to FIFO bus, competes for services of LAN bus controller 76. Arbitration mechanism is configured to split bandwidth evenly between receive requests and transmit requests. LAN bus controller 76 generates end-of-packet status read cycles for receive request data transfer operations. Status information is used to determine if received packet is good or bad. If error is sensed, received packet may be rejected.

Data bus width of LAN bus is 64 bits. LAN bus access is performed in burst mode (i.e., single-cycle burst mode) with maximum of 64-byte transfer, preferably executing at 8 data cycles in burst. LAN bus controller 76 is started by buffer scheduler when data buffer is allocated to receive or when data transfer from packet memory 16 to one of transmit buffers is complete.

Receive and transmit data to LAN bus is staged through 64-byte deep receive and transmit data buffers in datapath block 44. Receive and transmit requests arbitration and FIFO bus control are handled by LAN block. Buffer allocator 78 in datapath block 44 manages allocation of receive and transmit buffers, and packet engine block 82 handles movement of data between packet memory 16 and receive and transmit buffers.

Figure 6B:
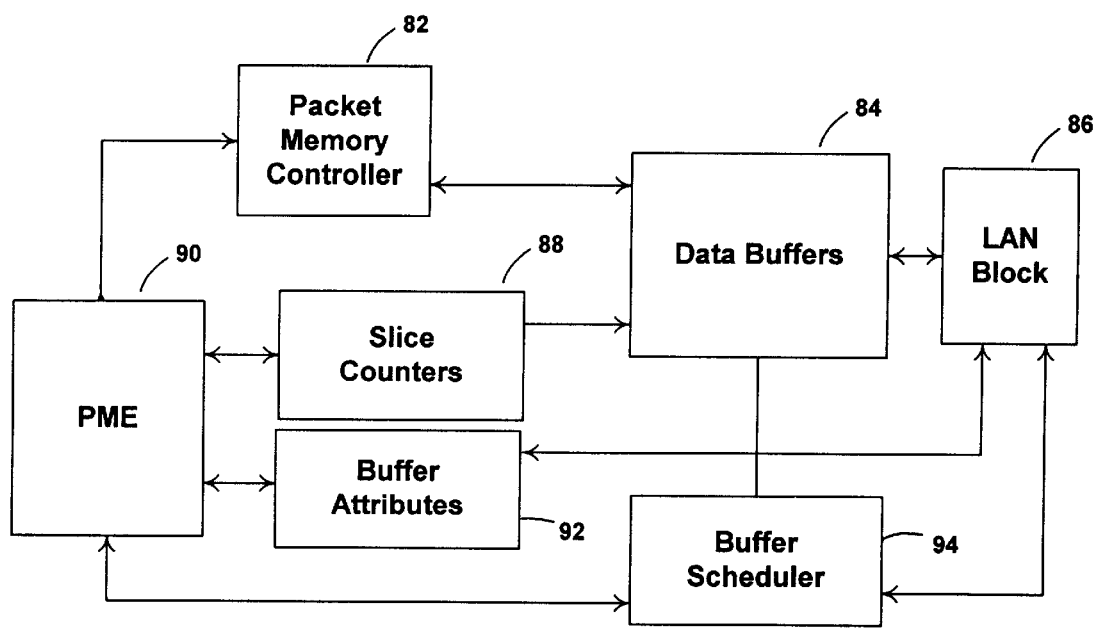

FIG. 6B shows datapath block 44 interface, including packet memory controller 82 coupled to data buffers 84 and packet memory engine (PME) 90. Data buffers 84 couple to LAN block 86, buffer scheduler 94, slice counters 88. Buffer attributes 92 couple to PME 90 and LAN block 86, which couple to buffer scheduler 94.

Data transfers between packet memory bus and MAC FIFO bus are staged through receive and transmit buffers 84 in datapath block 44. Block logic tracks state of buffers 84. Datapath block 44 interacts with LAN Block 86, packet engine block 82 and packet memory controller 82.

Data transfers between MAC FIFO bus-to-PM 16 and PM 16 to MAC FIFO bus occur through temporary datapath storage buffers 84 inside switch circuit 20. Buffers 84 match difference in bus access bandwidth for slice, and maintain concurrent transfers between FIFO bus and PM bus.

Two buffers are provided for transmission, and two buffers are provided for reception. Such buffers are associated with respective buffer status. Transmit buffers hold data form PM 16 to MAC FIFO (LAN) bus. Receive buffers hold data from MAC FIFO bus to PM 16. Each buffer has dedicated channel to PM SDRAM Controller. PM SDRAM Controller arbitrates each request to transfer on first-come/first-serve basis. On LAN side, appropriate buffer is selected for read or write.

Frame transfer across LAN bus occurs on slice basis. Slice is 64bytes. When switch circuit 20 is servicing port, slice of data transfers on single-cycle burst mode. Burst data transfer size is slice size, except for last slice in frame. Last slice size is decided by frame size. Ports are serviced, in time-division multiplex mode.

Receive slice buffer is used to capture LAN data from MAC FIFO. Slice is 64 bytes. Switch circuit 20 has two 64-byte buffers. During LAN FIFO read access, incoming 64-bit data words are strobed on selected slice buffers, word-by-word, during clock edges. Write order is from top to down. Receive status is maintained for respective receive slice. For example, slice status provides:

Receive slice size (represented by 6-bit number.) Maximum is 64 bytes. In read access, MAC provides in each data phase, valid bytes through bits (e.g., LBE#<7-0>). Hence, LBEI#<7-0> are registered and analyzed at end of data phase to provide cumulative slice size.

EOF signaling. MAC provides in each read data phase, if end-of-frame. EOFI# signal is registered and stored for EOF status. It is also used to close current transfer.

SOF signaling. MAC provides on each read data phase, if Start-of-frame. SOFI# signal is registered and stored for SOF status.

Transmit slice buffer is used to capture (e.g., PMDO) bus data and supply to LAN bus. Slice is 64-bytes. Switch circuit has two 64-byte slice buffers. During LAN FIFO write access, 64-bit data words are read from selected slice buffer. One clock pre-read is implemented to provide minimum delay time on LAN data (LD) bus. Read order is from top to down.

Status is maintained for respective transmit slice. Slice status is loaded by PM engine 90 when moving slice from PM. Status information includes:

Slice size (represented by 6-bit number.) Maximum is 64 bytes. When slice is read from PM bus, PM engine registers slice size.

EOF signaling. PM engine 90 registers signal while transferring slice from PM bus. If status is on, LAN FIFO controller asserts EOF# signal at appropriate data phase.

SOF signal. PM engine registers signal while transferring first slice of packet from PM. If status is on, LAN FIFO controller asserts the SOF# signal at first data phase.

Buffer scheduler 94 allocates transmit and receive data buffers to requesting agents, keeps track of busy/free status of each buffer, and allocates free buffer to requesting agent. Buffer scheduler 94 optimizes for (a) equal distribution of bandwidth between receivers and transmitters, (b) avoiding deadlock situation of transmit buffer, and (c) achieving highest concurrence of LAN bus and PM bus.

Datapath controller includes buffer attributes 92 for receive and transmit buffers 84, and track byte count per slice basis. Buffer attributes 92, such as End-of-Packet (EOF), start-of-packet (SOF), Byte Enables (BEB), and Slice Count are tracked from time data arrives into receive or transmit buffer until data leaves buffer. Buffer attribute 92 information is used by packet memory engine 90 to track progress of packet flowing through switch circuit 20 per slice basis. Datapath controller interacts with buffer scheduler 94 at end of slice transfer to release buffer. Synchronization between PM SDRAM controller and LAN bus interface 40 is thereby accomplished.

Packet memory resides on dedicated SDRAM bus. Switch circuit 20 integrates SDRAM controller to access packet memory 16. PM SDRAM controller functionality includes: 32-bit interface operating at 99-Mhz to 8 MB of external SDRAM; support for up to 7 internal requesting agents; arbitrates requests and generates request to SDRAM control block; pipelines requests for maximum efficiency and throughput; bursts of 4 (one bank), 8 or 16 (both banks) accesses on SDRAM; and maximum performance at 16 bursts and minimum performance at single read or write.

Route processing is provided by MIPS R4000 family RISC processor 12, which interfaces with switch circuit through address/data multiplexed bus. RISC processor interface may use external system controller, for example, for communicating with switch circuit 20 though processor slave port. RISC processor serves switch or route processor 12. Several register resources in switch circuit 20 are used by RISC processor 12 to control configuration and operation of switch circuit 20. RISC processor 20 may access resources outside of switch circuit 20, such access being controlled by switch circuit 20 packet memory 16, route cache memory, and CAM for L2 forwarding. Switch circuit 20 communicates status of operation and draws attention of processor 12 through status and process attention registers. When configured, switch circuit 20 performs DMA of data from packet memory to processor local memory, and forwards packets to processor queue maintained by switch circuit 20.

Preferably, route processor (RP) 12 is NEC Vr4300 RISC microprocessor from MIPS family with internal operating frequency of 133 Mhz and system bus frequency of 66 Mhz. Processor 12 has 32-bit address/data multiplexed bus, 5-bit command bus for processor requests and data identification, six handshake signals for communication with external agents, and five interrupts. Bus width can be selected as 32-bit operation. Processor 12 supports 1, 2, 3 and 4-byte single accesses and 2, 4 and 8 word burst accesses. Processor 12 uses little endian when accessing switch resources.

RP 12 is interfaced to switch circuit 20. RP 12 communicates with NMP 10 through interprocessor communication (IPC) bus 24, and accesses switch local resources, such as packet memory 16, L3 CAM (Route Cache) 28, control memory 136 and L2 CAM 142 through switch circuit 20 and local resources, such as local memory, ROM etc., through system controller. Two interrupts are used by switch circuit 20 to issue interrupt requests to processor 12. Two slaves on RP processor 12 system bus are switch and system controller. Switch is final agent to provide ready signal to processor requests that switch or system controller is ready to accept. During DMA transfer, switch acts as master.

Write access is implemented as 'dump and run' with two pipelined buffers to improve system performance. This allows two back-to-back write cycles. One read request is processed at a time. Processor 12 accesses internal registers resources in 32-bit mode. Write buffer and read buffer are provided to packet memory 16 to match frequency difference of 99-Mhz and 66-Mhz. Memory interface to switch is 32-bit. Maximum burst size to packet memory 16 is four 32-bit words (i.e., 16 bytes). Read buffers are provided to L3CAM and control memory 136 because of 16-bit interface to switch. Little endian is used when data is packed and unpacked during write or read requests to 16-bit interfaced memories. Maximum burst size to L3CAM 28 is 16 bytes, and to CM is 8 bytes. Write or read request to memories is arbitrated through agents inside switch, such as forwarding engine, L3 engine etc., so latency depends on various factors.

During write access, processor 12 owns mastership or control of bus. During read requests, processor 12 enters into uncompelled slave state after address phase, giving bus control to external agent to drive data.

Figure 7A:
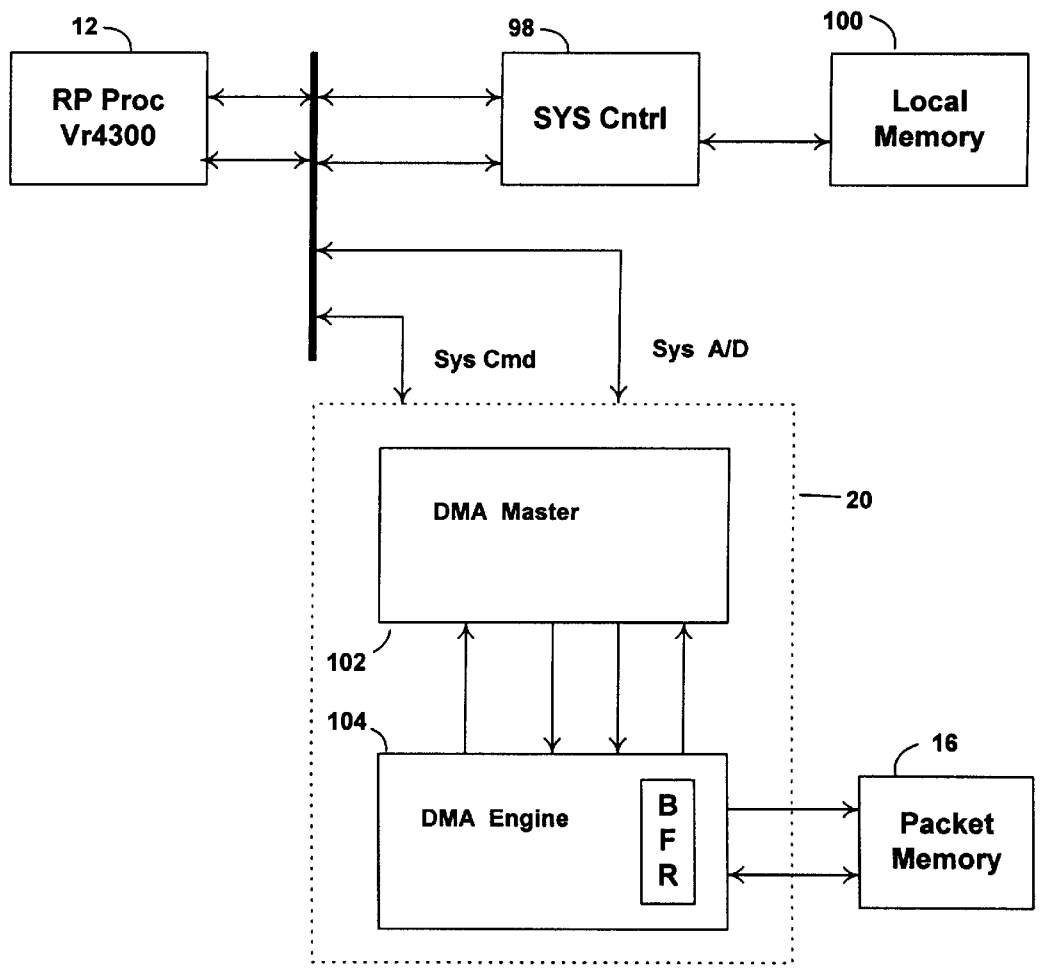
FIGS. 7A–B are block diagrams of DMA transfer between local memory and packet memory, and processor access to packet memory respectively of present embodiment.

FIG. 7A illustrates DMA transfer between RP processor 12 local memory 100 and packet memory 16. DMA transfer between packet memory 16 and NMP processor local memory is also provided in architecture. NMP processor system controller responds to DMA master requests between packet memory and NMP processor local memory. DMA is implemented using two design blocks called DMA engine 104 and DMA master 102. DMA engine is interfaced to packet memory 16 and that of DMA Master to processor system bus. DMA is initiated by setting bits in DMA command register. DMA transfer between local memory 100 and packet memory 16, or vice versa, occurs substantially as follows:

DMA engine 104 notifies DMA master 102 to initiate DMA transfer when packet is pending by giving request. DMA master 102 arbitrates for processor bus with RP processor 12 as another master by giving request (e.g., EREQ) to processor 12. During DMA transfer, switch circuit 20 acts as master to system controller 98. Processor gives bus control to RP processor when ready. When bus is granted by processor, DMA transfer begins. Mastership of processor bus can be re-acquired by RP processor 12 between each slice transfer, which is maximum of eight 32-bit words (i.e., 32 bytes). DMA engine 104 reasserts request after each slice transfer, until block of packet data is transferred. At end of DMA, bus control is given to processor.

When bus is in uncompelled slave state, DMA master 102 does not access processor system bus to simplify design. While DMA transfer is taking place on bus, system controller 98 does not drive bus, assuming bus in slave state.

Figure 7B:
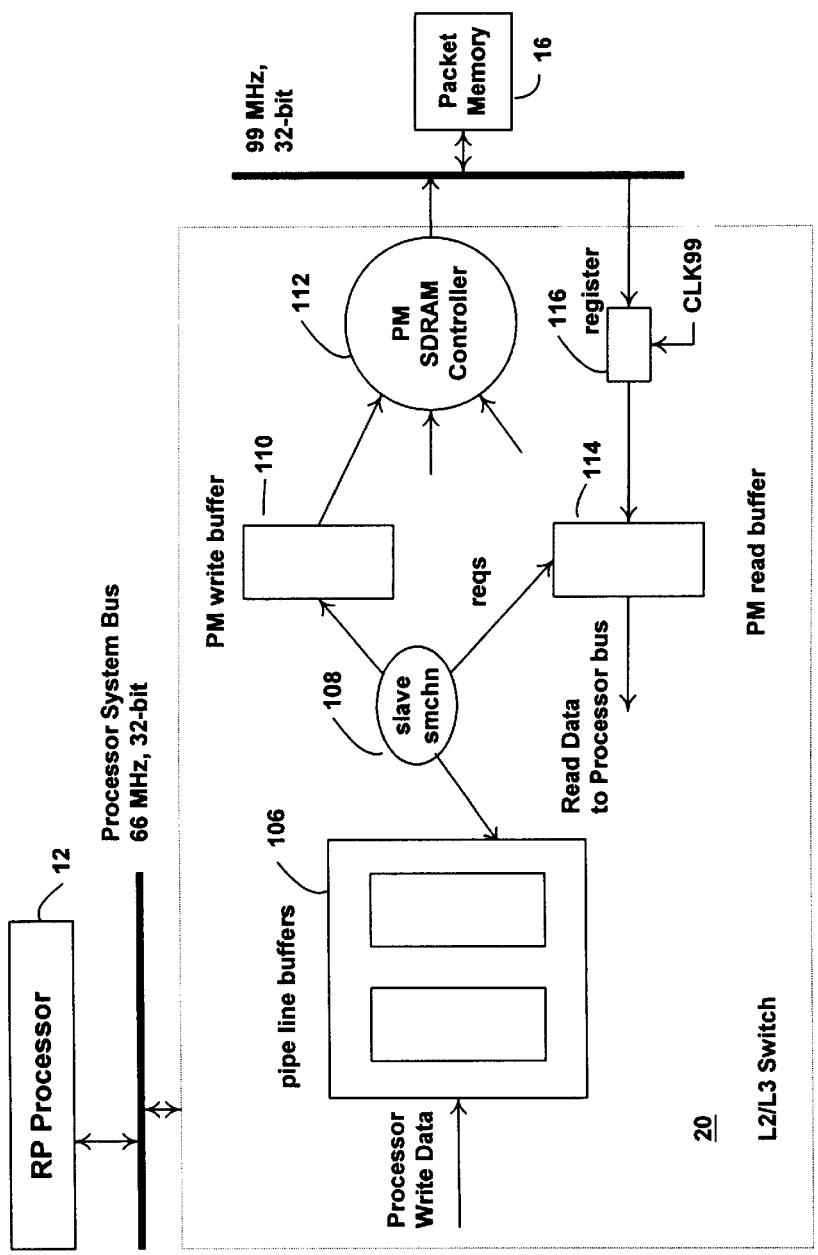

FIG. 7B illustrates RP processor 12 access to packet memory (PM) 16 through L2/L3 switch circuit 20. Switch interface to packet memory 16 is 32-bit, and maximum burst size is 16 bytes. Synchronous DRAM is chosen for packet memory that can be operated at 66-Mhz, 99-Mhz and 125-Mhz frequencies. During processor write request, processor dumps write-data into front-end pipeline buffers 106. Slave state machine 108 provides such data into packet memory write buffer 110. Processor request is arbitrated with LAN requests and L3 engine requests in PM SDRAM arbiter to access PM 16. PM SDRAM controller 112 generates control signals for SDRAM. During processor read request, read-data is provided in PM read buffer 114 from packet memory bus. Synchronizer 116 converts 99-Mhz signal into 66-Mhz pulse signal that initiates slave state machine to empty read buffer. Read data is muxed with data from other blocks and driven to processor system bus. Packet memory to local memory (PM-to-LM) DMA transfer data is not written into read buffer, but passed to processor system bus.

Figure 8A:
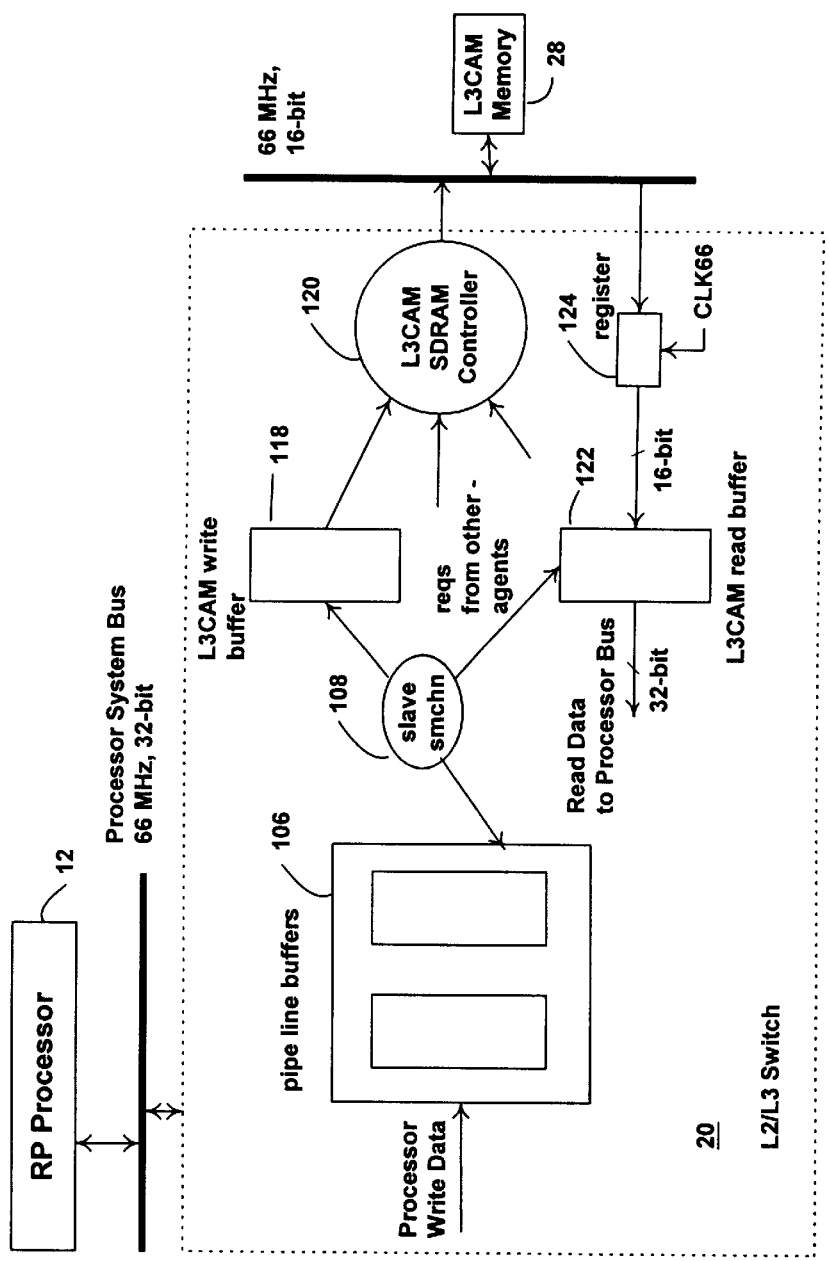
FIGS. 8A–B are processor access to L3CAM memory and control memory respectively of present embodiment.
Figure 8B:
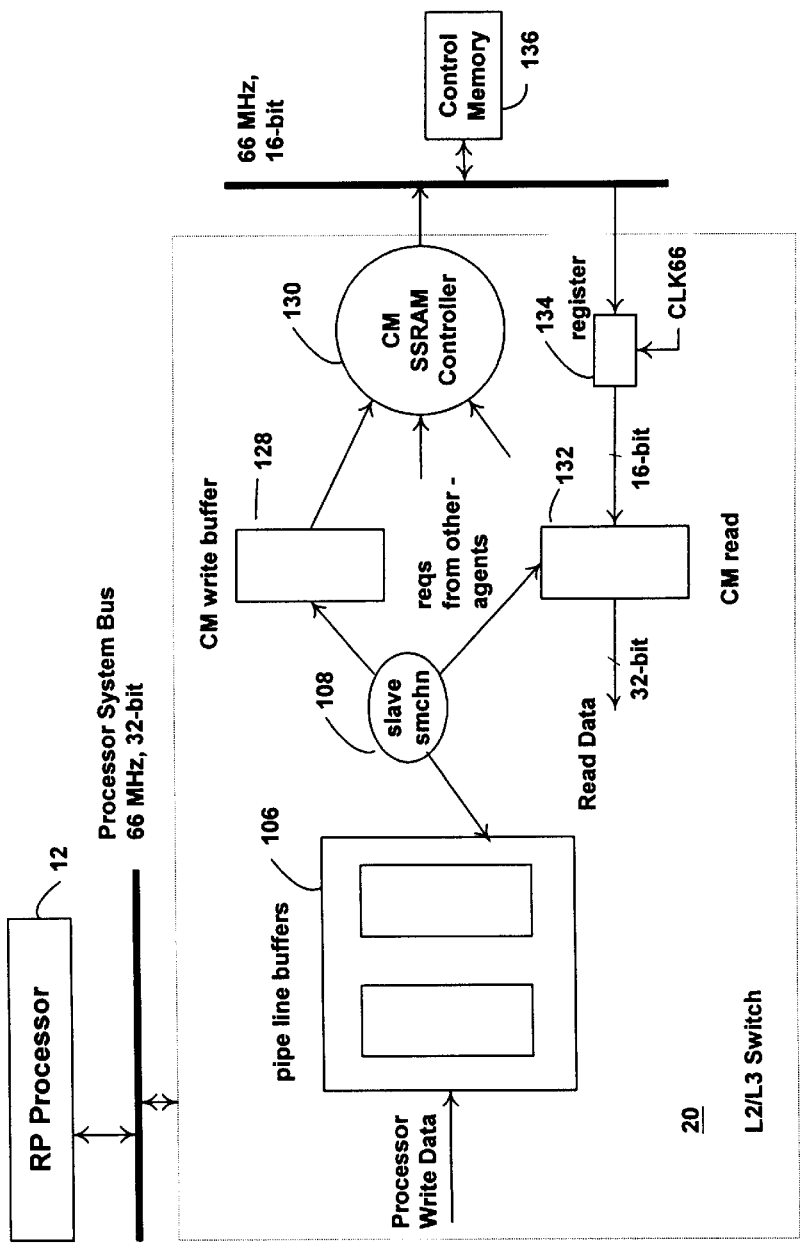

FIG. 8A illustrates RP processor 12 access to L3CAM (route cache) memory 28. RP processor 12 accesses L3CAM 28 through switch circuit 20 to initialize entries and maintain data structures. Additionally, FIG. 8B shows control memory 136 access through switch circuit 20. For both such memory accesses in FIGS. 8A–B, RP processor 12 couples to switch circuit 20 through 66-Mhz, 32-bit processor system bus, wherein pipeline buffers 106 receive processor write data and couple to slave state machine 108.

In switch circuit 20 shown in FIG. 8A, L3CAM write buffer couples to slave machine 108 and L3CAM SDRAM controller 120, which receive requests from other agents and couples to L3CAM memory 28 through 66-Mhz, 16-bit bus. L3CAM read buffer 122 provides read data through 32-bit processor bus and couples to slave state machine 108 and register 134 over 16-bit bus. Register 134 receives 66-Mhz clock signal and couples to L3CAM memory 28 through 66-Mhz, 16-bit bus.

In switch circuit 20 shown in FIG. 8B, CM write buffer 128 couples to slave machine 108 and CM SSRAM controller 130, which receive requests from other agents and couples to control memory 136 through 66-Mhz, 16-bit bus. CM read buffer 132 provides read data through 32-bit processor bus and couples to slave state machine 108 and register 124 over 16-bit bus. Register 124 receives 66-Mhz clock signal and couples to control memory 136 through 66-Mhz, 16-bit bus.

Synchronous SDRAM is chosen for L3CAM 28, and Synchronous SRAM is chosen for control memory 136. Switch interface to both memories is 16-bit, and both memories operate at 66-Mhz. Processor 12 access to memories is similar in both cases, maximum burst size to L3CAM memory is 16 bytes, and maximum burst size for control memory 136 is 8 bytes. Data is packed and unpacked for each processor access.

Each memory 28, 136 has write buffer 118 into which processor write-data is provided from pipeline buffers 106 by slave state machine 108. Since memory interface is 16-bit, processor write data is divided into two 16-bit half words. Processor 12 request to L3CAM memory 28 is arbitrated with L3 engine requests. Processor 12 request to control memory is arbitrated with forwarding engine, FQMB, L3 engine, XQMB, BAM and DMA. During processor read request, L3CAM or CM read data from memory bus is provided in read buffer. When last transfer is triggered, slave state machine 108 starts emptying read buffer 122 appropriately and packs two half words into 32-bit word, and puts on processor system bus.

Figure 9A:
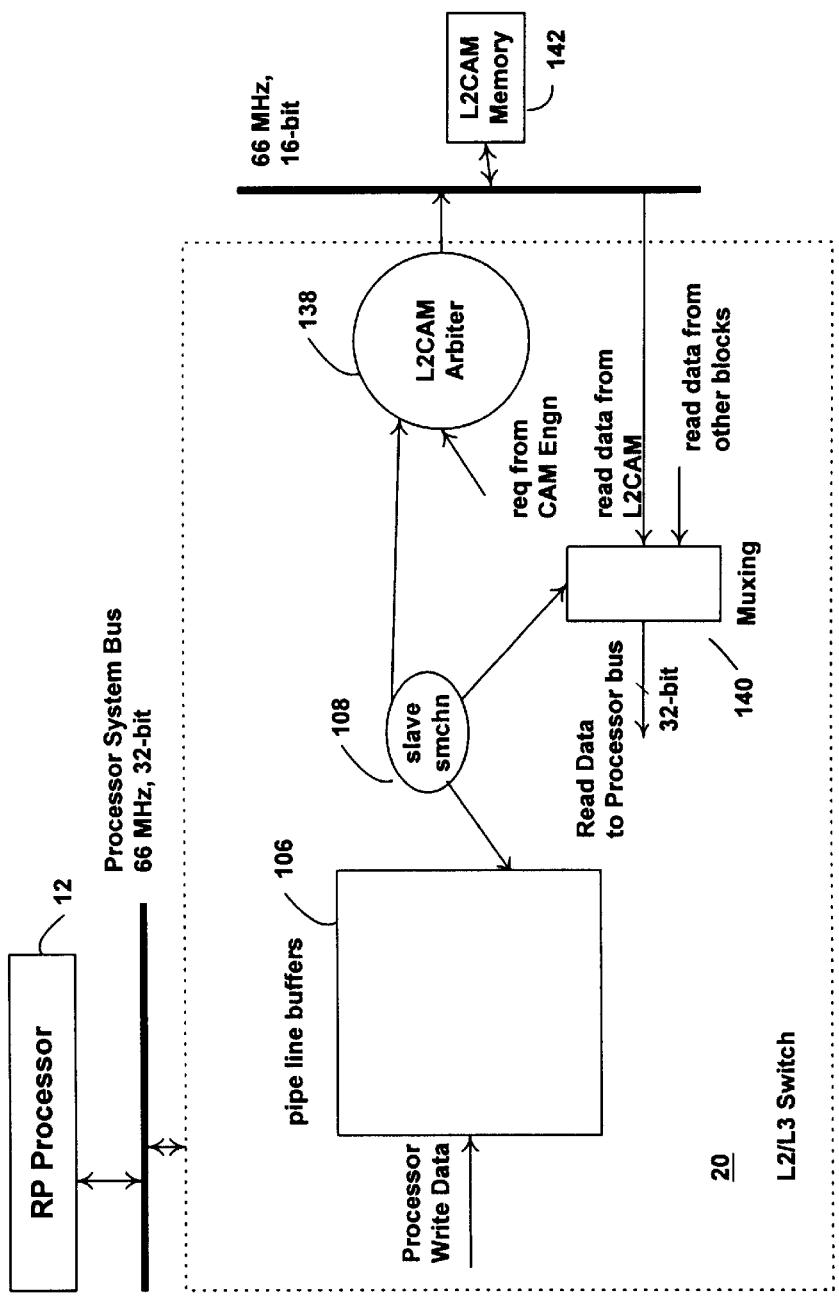
FIGS. 9A–B are processor access to L2CAM memory, and LAN arbiter interaction with datapath respectively of present embodiment.

In FIG. 9A, RP processor 12 accesses L2CAM memory 142 through switch circuit 20. Content Addressable Memory (CAM) is chosen for accessing L2CAM memory 142, which operates at 66-Mhz frequency. Switch circuit 20 interface to L2CAM memory is 16-bit. Processor 12 executes commands write/read and data write/read to L2CAM 142 using CAM access registers provided inside switch circuit 20. Processor 12 accesses L2CAM 142 through register-based request-grant handshake by loading L2CAM Access Control & Status Register to execute processing cycles.

RP processor 12 arbitrates with CAM arbiter 138 in switch circuit 20 for CAM bus. For processor requests, slave state machine 108 generates control signals for CAM 142, and CAM arbiter engine 138 processes switch requests. During processor write request, processor 12 provides write-data in pipeline buffers 106. When CAM bus is granted by CAM arbiter 138, slave state machine 108 puts data from pipeline buffer 106 on CAM bus. During read request, read-data from CAM bus is muxed 140 with data from other blocks and passed to processor system bus. Write/read buffers need not be provided in present case.

Figure 9B:
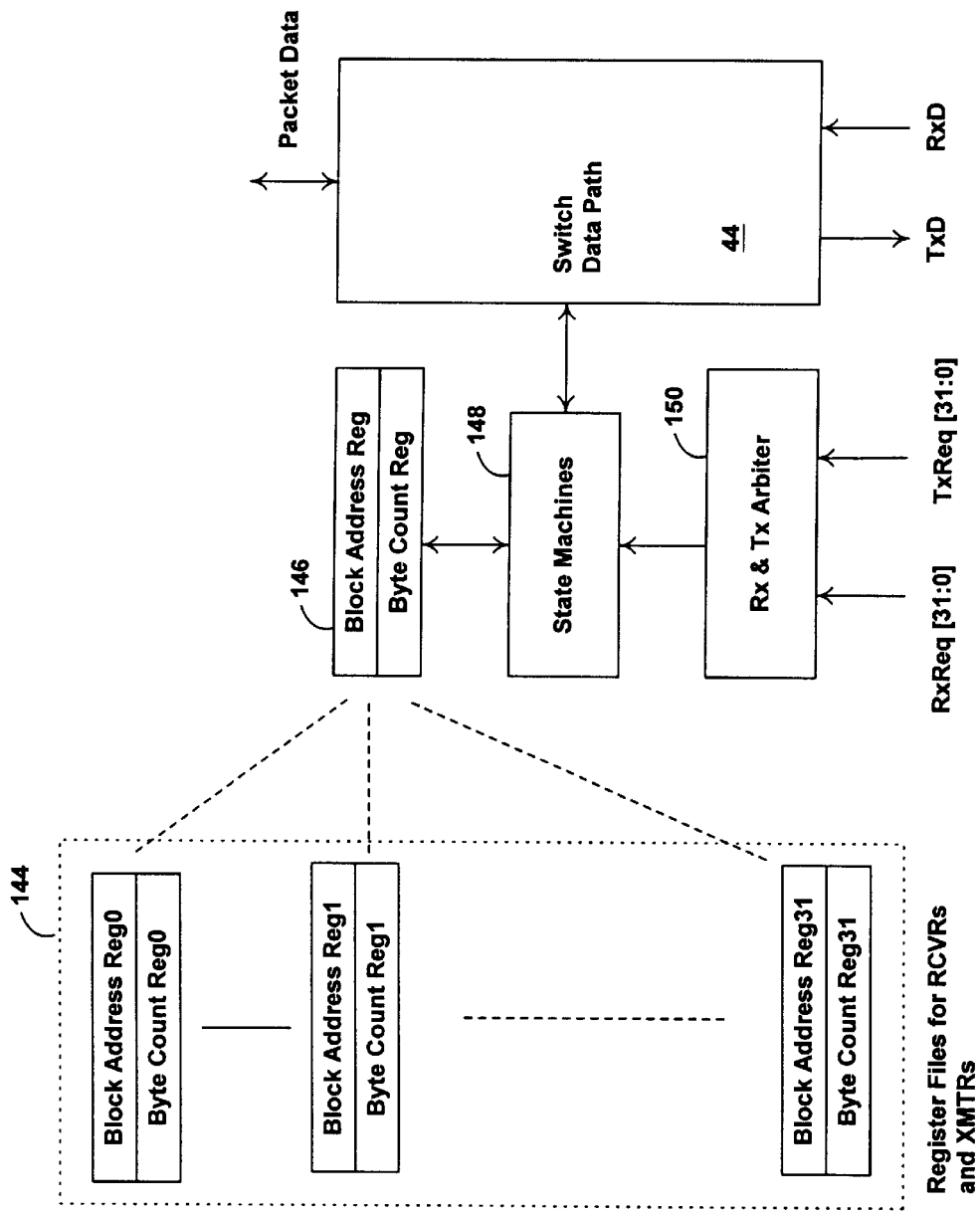

FIG. 9B shows LAN arbiters interaction with datapath. Register files 144 for receivers and transmitters, including corresponding block address registers and byte count registers, couple to block address register and byte count register coupled to state machines 148, which couple to switch data path 44 and receive and transmit arbiter 150.

Packet switch engine 82 performs control functions for transfer request in and out of receive and transmit buffer to packet memory 16. Packet engine 82 handles LAN data movement, command process, and PM address calculation.

For LAN data movement, packet memory engine 82 sets up for moving slice between packet memory 16 and allocated data buffer. This is triggered by scheduler while slice is scheduled to move in/out of data buffer. PM engine has access right to block address registers and registers to understand actual address on PM 16 and update packet size.

For command process, packet memory engine 82 executes systematic hardware processes when Forwarding Block and Transmit Queue Management Block (FB/TQMB) generates instructions such as: link, receive enable, transmit enable, receive reject, etc. Hence, end of packet reception/transmission is noticed for next packet initialization. In notifying such events, priority encoding is provided for first-in/first-service integrity.

For PM address calculation, packet memory engine 82 regards Ethernet ports as 32 concurrent full-duplex DMA channels. Relevant PM pointers for each channel are maintained. For every slice transfer, PM bus address is calculated.

Preferably, buffer attributes 92 are provided in attribute block address array, which is 3-port architecture having 64×12-bit 3-port memory array. Port-1 is write port; port-2 is read port; and port-3 is read port. Packet memory engine 82 can write/read memory locations using various ports. Forwarding engine (FE) can read locations asynchronously. Port-3 is assigned for FE.

First 32 locations are used for "Receive block address" of 32 receive ports. Next 32 locations are "Transmit block address" for 32 transmit ports. PM Engine 82 initializes block address for receive/transmit ports on command of Auto Forwarding Block. PM engine 82 reads block address relevant to receive/transmit port under service. PM engine 82 uses block address to identify packet in PM 16.

CAM interface block analyzes incoming packet at layer 2, i.e., at MAC layer. Analysis result is forwarded to Auto Forwarding Block state machine. CAM processor is called for attention when ether header block is loaded in ether header memory. On such trigger condition, after acquiring CAM bus interface, CAM Processor starts defined fast processing action. Block contains layer 2 header memory, analyzed and to be analyzed port FiFOs, and result memory. CAM block interfaces to internal memories organized as memories and FIFOs as well as external CAM to accomplish L2 lookup.

When begin transfer of receive data, begin of header is identified and required header information is loaded into ether header memory. Sixteen-byte header blocks are reserved for each port in header memory. Loaded indication is updated on 5-bit entry in 32-deep ether header to-be-analyzed FIFO. Such FIFO provides first-in/first-service feature.

Ether header memory is 2-port memory has 64×64 bit architecture. Port-1 is write port, and port-2 is read port. Such memory is located on LAN side of receive buffer. As first slice of new receive packet is loaded into receive buffer, header slice (i.e., 16 bytes) is written to ether header memory in 64-bit words. Ether port number is used as reference address to select header block number. Maximum of 32 header blocks can be stored in such memory. Port-2 is used by CAM processing engine. CAM engine reads 16-bit quantity at a time through front-end 64:16 multiplexer. L3 header information, up to 8 bytes per port is stored in different memory. Such information is used by L3 lookup engine during routing operation.

Ether-to-be-analyzed FIFO memory is 32×5-bit two-port memory, holding maximum of 32 port numbers to be analyzed. Port-1 is write port, and port-2 is read port. FIFO is written with port number when first slice of data is received on LAN bus and header loaded in ether header memory. CAM Processor reads port number through port2 for indexing header memory. FIFO structure ensures that ports to be analyzed are presented to CAM engine in arrived order.

Ether analyzed FIFO memory is 32×6-bit two-port memory, holding maximum 32 analyzed port numbers. Port-1 is write port, and port-2 is read port. CAM Processor writes analyzed port number through port-1 and Forwarding Engine (FE) reads through port-2. FIFO structure ensures that analyzed ports are presented to forwarding engine in arrived order.

Ether result memory is 32×16-bit two-port memory, holding results for 32 ether ports. Port-1 is write port, and port-2 is read port. CAM Processor writes L2 forwarding result through port-1, and Forwarding Block (FB) reads through port-2. When CAM Processor processes specific ether port header, it uses port number as address to write result. FB reads port number from Analyzed FIFO to make forwarding decision. FB uses port number as reference address to read CAM analysis result.

External CAM memory is 1024×64-bit capacity on standard configuration. Size can be expanded to 2048×64-bit by adding CAM device in vertical expansion. CAM memory is connected on dedicated CAM bus. Such bus is shared between CPU and switch circuit. Normally such bus is default-owned by switch circuit. CPU can use bus by register mode bus handshake.

CAM memory contains 1024 locations of 64 bits wide. Locations can be assigned as RAM property or CAM property. Location assigned as RAM will not be accounted in lookup process; CAM locations participate in lookup process. Repeatedly used parameters are stored in RAM so that real-time data movement between RAM location and Comparand/mask registers/etc. can happen with minimum overhead. Every location has associated status filed which describes entry, such as: empty entry, valid entry, skip entry on lookup, and RAM entry.

Layer 2 header analysis is performed by CAM processor. Ethernet headers are loaded and processed on dedicated Ethernet header memory having 128×32 bit dual port memory. Assuming case where packet received on port(x), switch circuit 20 is triggered on such packet by request from MAC port number(x), which is effectively hardware packet arrival notification.

Header is extracted from MAC received data stream. New receive packet data is identified with arrival of SOF, and first 16 bytes are treated as layer-2 header. If header is concurrent to store access to receive buffer, then header is stored in port-specific block number(x) in header memory. Writing process may not account for port contention. Block written on port-1 may not be accessed on port-2. Header is stored as header block(x). At end of storage, port number is written in ether-to-be-analyzed FIFO, which is 32×5-bit register. FIFO write pointer is incremented after each status write CAM processor starts when valid entry is loaded in Ether-to-be-analyzed FIFO. CAM Processor maintains read pointer to read valid entry. Valid entry is notified if there is difference between write pointer and read pointer. Entry read provides port number of header. CAM Processor uses port number to reach header block(x).

Preferably, switch system has 32 ports and 32 entries. New packet on port can not be received unless old packet is processed, according to system-level handshake. Hence, at any time, no more than 32 headers/header status may be stored, effectively reducing complexity of FIFO design. PM engine can blindly write header/status without looking for FIFO-full condition. CAM Processor can start as long as pointers are not equal.

CAM processor handles header processing. CAM processor is notified of Ethernet header valid when write pointer and read pointer differ. When entry is valid on Ethernet-to-be-analyzed FIFO, CAM processor reads entry and increments read pointer. Using such value, CAM processor can reach specified header block. Ether header memory is divided into 32 blocks. Port number directly provides starting address of header block. Entries in block are consecutive 16 bytes.

CAM processor processes header block, and writes result on port specific location on Ether result memory. CAM process completion is notified to Auto Forwarding Block through Ethernet result FIFO, which is 32 deep register construction. Each entry is 6-bit wide. Entry is result of CAM memory lookup. If set, destination MAC address indicates CAM hit. Routing tag in header block is valid. If clear, CAM lookup fails; routing tag does not contain valid information.

To write on result FIFO, CAM processor has write pointer, which is 5-bit counter. CAM processor write entry, whereas AFB read entry. When CAM completes process, it writes result entry, and increments write pointer. At last, CAM processor increments Ether header status FIFO read pointer to point to next entry.

CAM processor header processing includes learning process of: source lookup, source port read, and source learning. CAM processor learns MAC addresses arriving from Ethernet ports. As associated process of CAM lookup, CAM processor determines whether source address was learned previously, i.e., by reading source address from Ether header memory, and writes CAM for lookup. If match occurs, processor presumes source port was learned; it reads existing port information from associated data to compare whether port is same as receiving port. If MAC header matches, whether or not ports match, processor makes entry live and at same time re-learns receiving port. If receiving port number does not match learned port, Source Address (SA) Learned flag is set. If miss, processor learns entry into next free address if CAM is not full, and if learned SA Learned flag is set. While updating such new entry, processor follows correct data structure for RAM associated information.

Optionally, attribute is set with (e.g., ETHR_LRN_INHIBIT) register for each port to inhibit learning on specified ports. If set, during source lookup process, after source port read, entry is made live if hit and if miss, MAC address is not learned. Source port read phase can be skipped if source port filtering is not required.

Destination lookup process includes steps: destination lookup and destination port read. CAM processor reads 6-bytes destination MAC address from header memory and writes on CAM for comparison lookup. If miss, destination is assumed unknown; if hit, destination is available through memory (e.g., ARAM) field, which provides destination port number and port/MAC address specific status and control flags. If hit, CAM processor reads ARAM field and writes in result memory, setting hit flag. If miss, CAM processor has nothing to read and write miss flag to result memory. Rest of result data is not valid in miss case. Forwarding blocks read this field for analysis and forwarding decision. At end of process, CAM analysis done flag is set for packet on receiving port.

CAM processor analyzes results of source lookup and destination lookup processes to determine how to process incoming packet. Each port has two bits allocated to handle spanning-tree protocol requirements. One bit is allocated for 'Port Blocked State' flag and other for 'Learn Inhibit' flag, which is used for learning of MAC addresses on receiving port. Port Blocked State' flag is used for forwarding decision. Filtering bits in result from both source lookup and destination lookup along with port specific STP control bits relating to forwarding, source port and destination port read as result of destination lookup and read are considered.

CAM processor sets CAM analysis completion status for receiving port. If destination lookup resulted in hit and destination port is one of physical LAN ports and cut-thru switching on port is enabled or CPU port, port number is written to Ether analyzed FIFO. CPU port is allowed to enable Layer 3 analysis parallel to packet reception. Result processing is done by Auto Forwarding Block (AFB). AFB is notified of CAM process completion through Ethernet Analyzed FIFO. AFB can read highest priority FIFO entry using hardware hidden read pointer. If read pointer and write pointer are different, one or more valid entries are available in Ethernet analyzed FIFO. AFB reads valid entry and gets port number. Reading entry increments read pointer, if present entry is valid.

Using port number, AFB can access Ether result memory. Refer to Auto Forwarding Block section for details on AFB functionality. If CAM analysis resulted in miss or hit but packet can not be switched, AFB does not need to be notified until packet reception is complete. Hence, CAM processor merely sets CAM analysis completion flag for receiving port. AFB processes packet when both receive completion and CAM analysis completion set for receiving packet.

Aging process is performed by processor 12 as processor bandwidth requirement for task is relatively low. Time stamp register provides variable granularity for aging. Processor uses instruction set provided by CAM device. Entries to be aged are processed in one instruction, though setup is required before executing instruction. In addition to status bits provided by CAM for every entry, 3 bits in RAM field are dedicated for aging information. Status provide by CAM are used to identify if entry is 'Valid', 'Empty', 'Skip' or 'RAM only'. One of bits allocated in ARAM field is used to mark entry 'Permanent'. Entries marked 'Valid' and not 'Permanent' are considered for aging. Additional two bits in ARAM filed provide flexibility to CPU to implement aging process.

When entry is visited during source lookup process of CAM analysis, if source is found, ARAM filed is updated with latest time stamp from (e.g., ETHER CAM CONTROL) register. If new source is learned, in addition to port, time stamp bits are written into ARAM field. When processor visits CAM to ageout entries, it searches CAM for entries with oldest time stamp. In search process, processor configures mask registers in CAM in such way that age bits enter comparison, and entries that are not 'Valid' and marked 'Permanent' do not enter comparison. In next instruction, processor can clear 'Valid' bits on matching locations to 'Empty' state. By doing so, oldest entries are marked empty. From that point, aged entries do not enter compare operation until made 'Valid' aging during normal learning process.

Auto forwarding block (AFB) is hardware Ethernet packet forwarding engine and queue processor. AFB analyzes incoming packet and may forward packet both at layer 2 and layer 3. After forwarding analysis is done, AFB posts and maintains port queues. AFB may accept packets from processor interface and post packet in requested queues. AFB provides processing power on packet-by-packet and manages required information for integrity of packet routing strategy. AFB feeds initial setup information for each ether packet for each port to run data transaction.

AFB functionality enables switch circuit 20 to perform forwarding and filtering without real-time assistance from processor 12. Processing element is out of the datapath, and forwarding and filtering is done at line rate for supported ports. AFB functionality includes: free queue management, block attributes management, receive port management, forwarding and filtering, transmit queue management, quality-of-service (QoS) support, and control memory interface.

Forwarding function features port linking, wherein receive port is linked to transmit port before packet is fully received, thereby improving latency between received and transmitted packets. Port linking is accomplished in forwarding stage if conditions are suitable. For example, packet can cut-thru with unique destination, i.e. no more than one port is target destination for packet. Cut-thru enable bit are satisfied for certain values, such as: destination port, speed-matching logic, xmtPortEn, xmtPortNotBsy, xmtQNotVld and mirrNotVld. Data arrive speed should not exceed transmitting port speed. Transmitter should be ready to accept command. Transmitter may be busy transmitting data, or there may be packets waiting for queue transmit. Also, there should be minimum of data present in buffer before process can start or arbitration latency may result in transmit FIFO under-run condition. In such case, transmitter is linked but does not start transmitting data until required minimum data is received in packet memory.

Figure 10A:
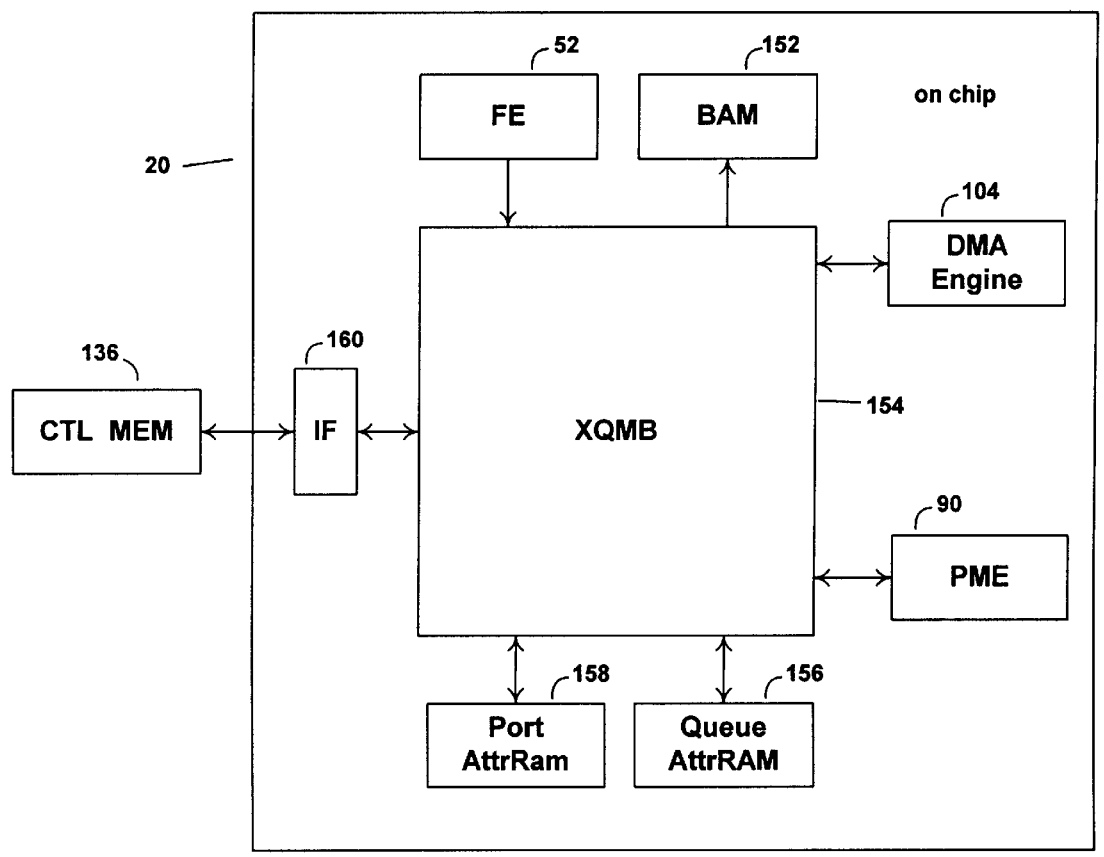
FIGS. 10A–B are transmit queue management block (XQMB) interfaces and operation respectively of present embodiment.
Figure 10B:
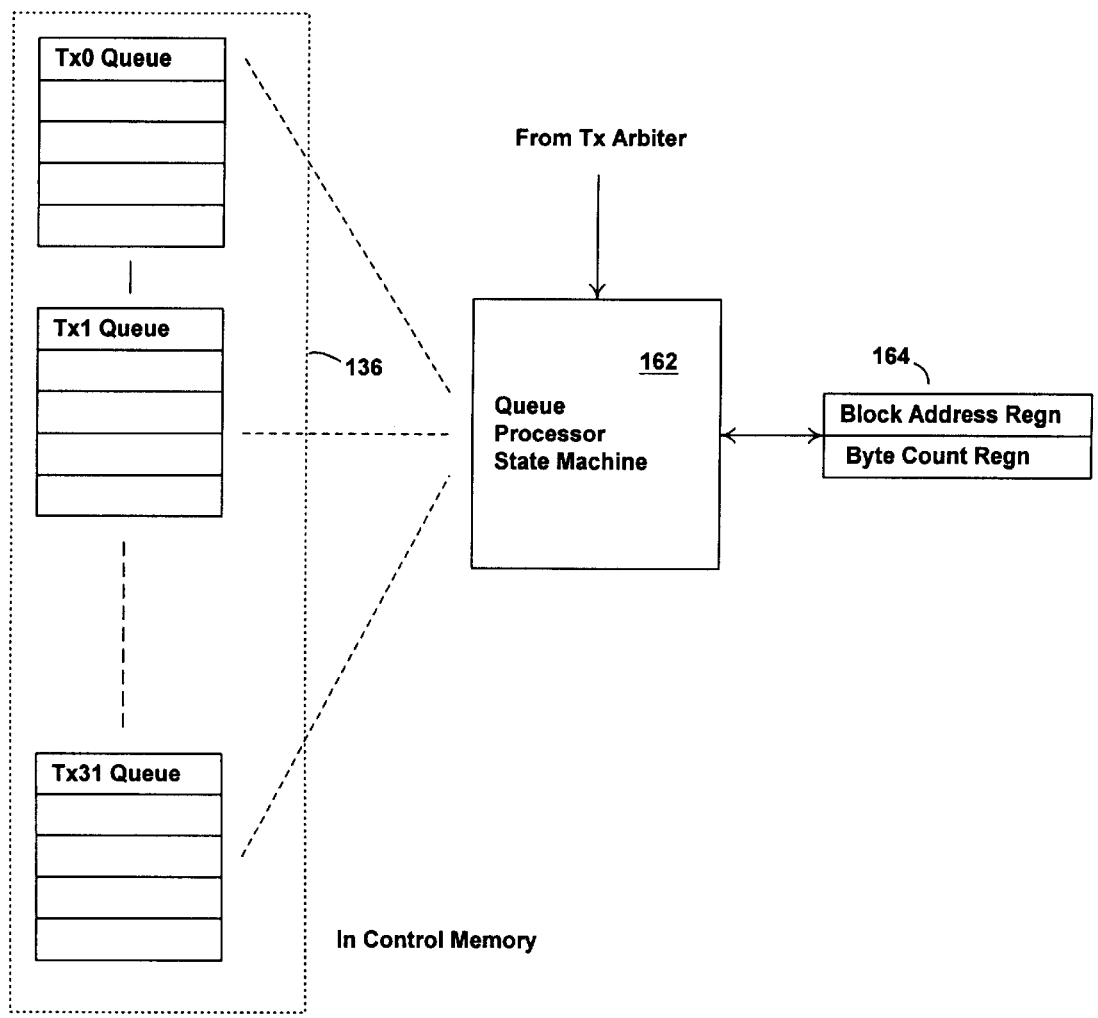

FIG. 10A shows Transmit Queue Management Block (XQMB) 154, which is hardware block for managing transmit queue functions for switch circuit 20. XQMB 154 couples to forwarding engine (FE) 52, DMA Engine 104, block attribute memory (BAM) 152, PME 90, queue attribute memory (e.g., AttrRAM) 156, port AttrRAM 158, and control memory 136 through interface 160. XQMB 154 functionality includes: initializing and managing transmit queues for each port; maintaining QOS parameters (i.e., tokens) for each port; queues (e.g., nQueues and dQueues) blocks to/from control memory transmitter queues; forwarding blocks to requesting transmitter; returning block numbers to BAM controller 152; forwarding multi/broadcast block in 'background'; supporting 28 physical ports, 3 logical ports and multi/broadcast port; and using round-robin priority scheme to service requests. Furthermore, FIG. 10B shows queue processor state machine 162, which couples to transmit arbiter 80, block address and byte count registers 164 in control memory, and transmit queue 136.

Figure 11:
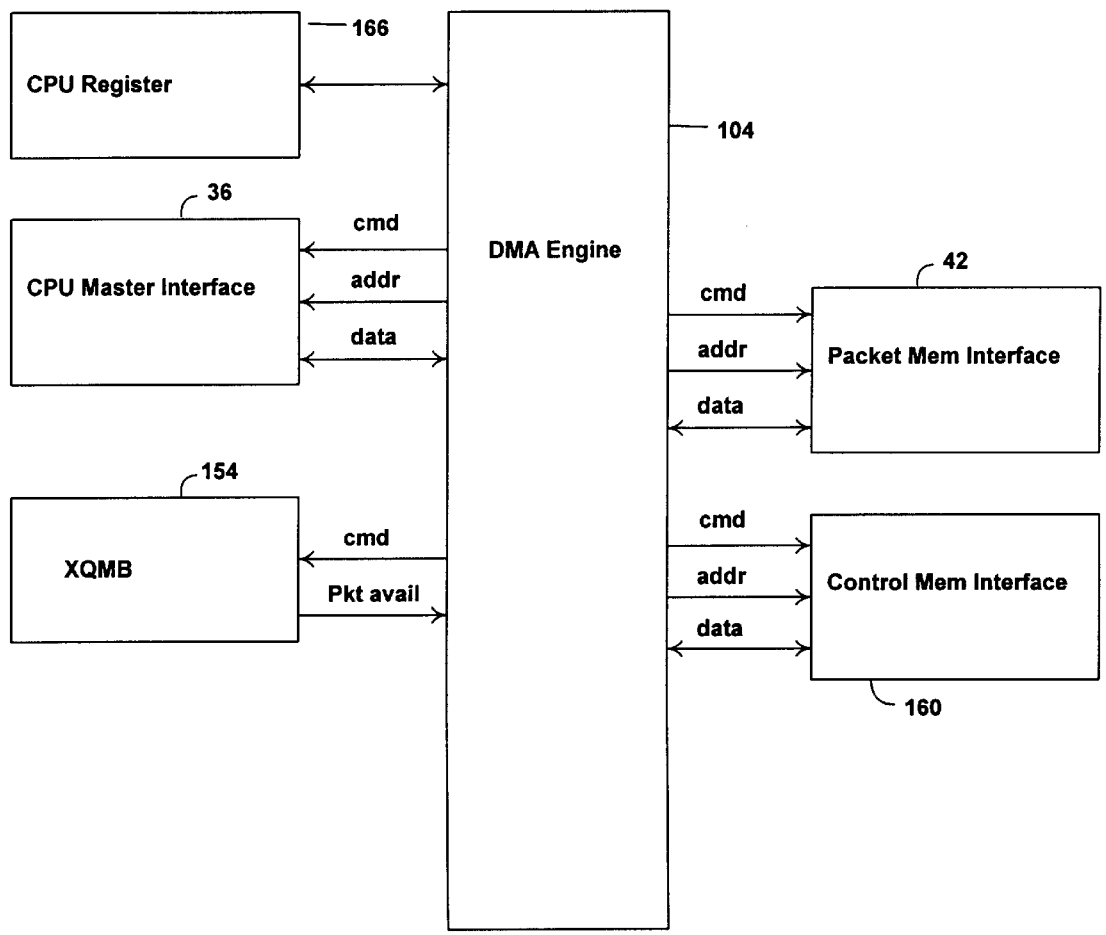
FIG. 11 is DMA block diagram of present embodiment.

FIG. 11 shows DMA engine 104, which couples to CPU register 166, CPU master interface 36, XQMB 154, packet memory interface 42, and control memory interface 160. Generally, DMA engine handles data transfer between packet memory 16 and CPU local memory 100 so that CPU 12 may perform other tasks. CPU 12 packet send is enabled by creating packet in local memory 100, register set-up, and initiating packet transfer. Also, packet receive is enabled by notifying CPU 12. CPU 12 checks block attribute to determine whether to process packet. If CPU 12 transfers packet to local memory 100, it DMA engine 104 is notified to proceed. Otherwise, register is written to de-queue packet.

Figure 12:
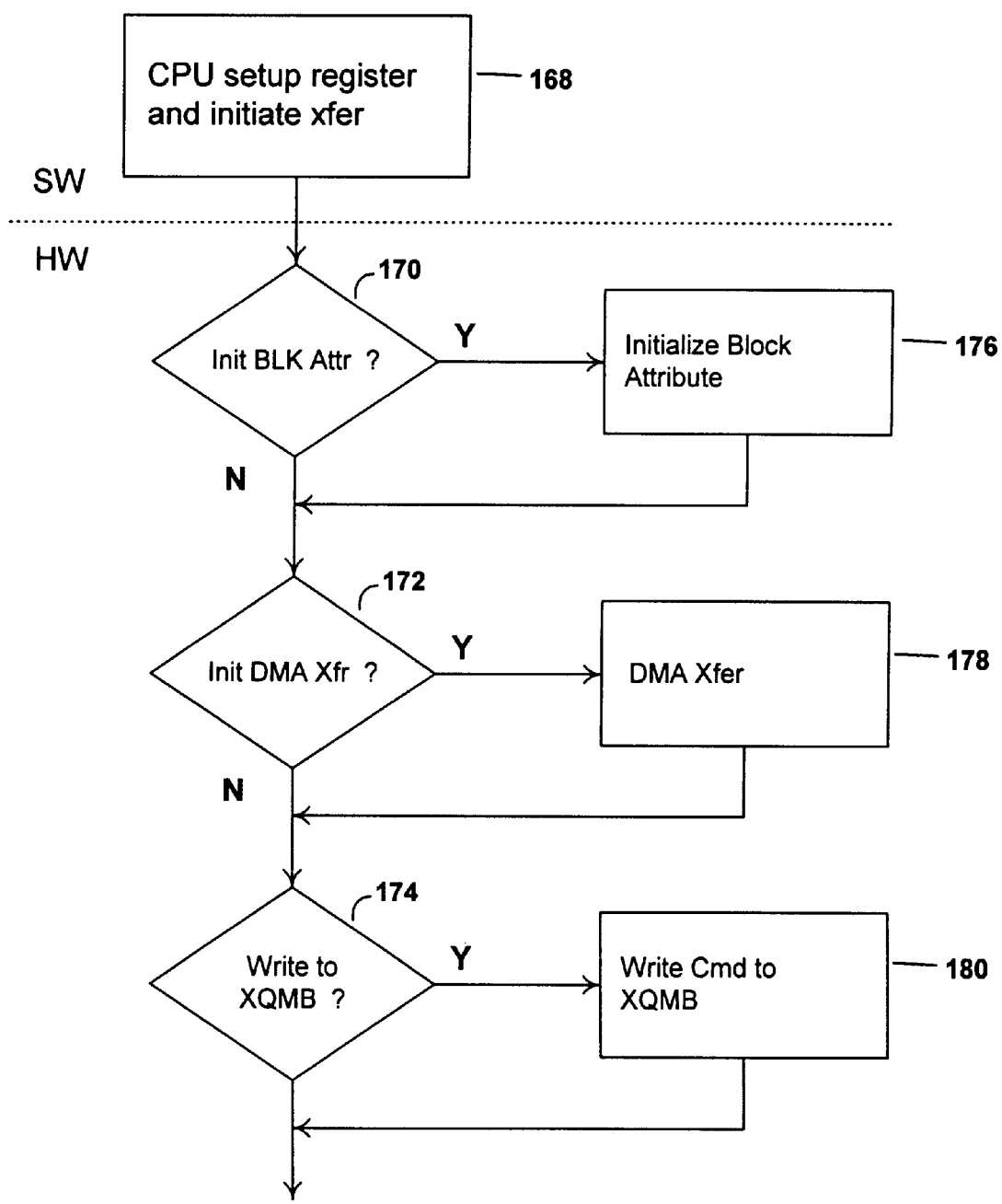
FIG. 12 is flowchart of CPU-to-packet memory operation of present embodiment.

FIG. 12 flow chart shows CPU 12 to packet memory 16 operation. Initially, in software, CPU sets-up register and initiate packet transfer 168. Then, in hardware, processor determines 170 whether to initialize block attribute 176, whether 172 to initialize DMA transfer 178, and whether 174 to write command to XQMB 180.

Figure 13:
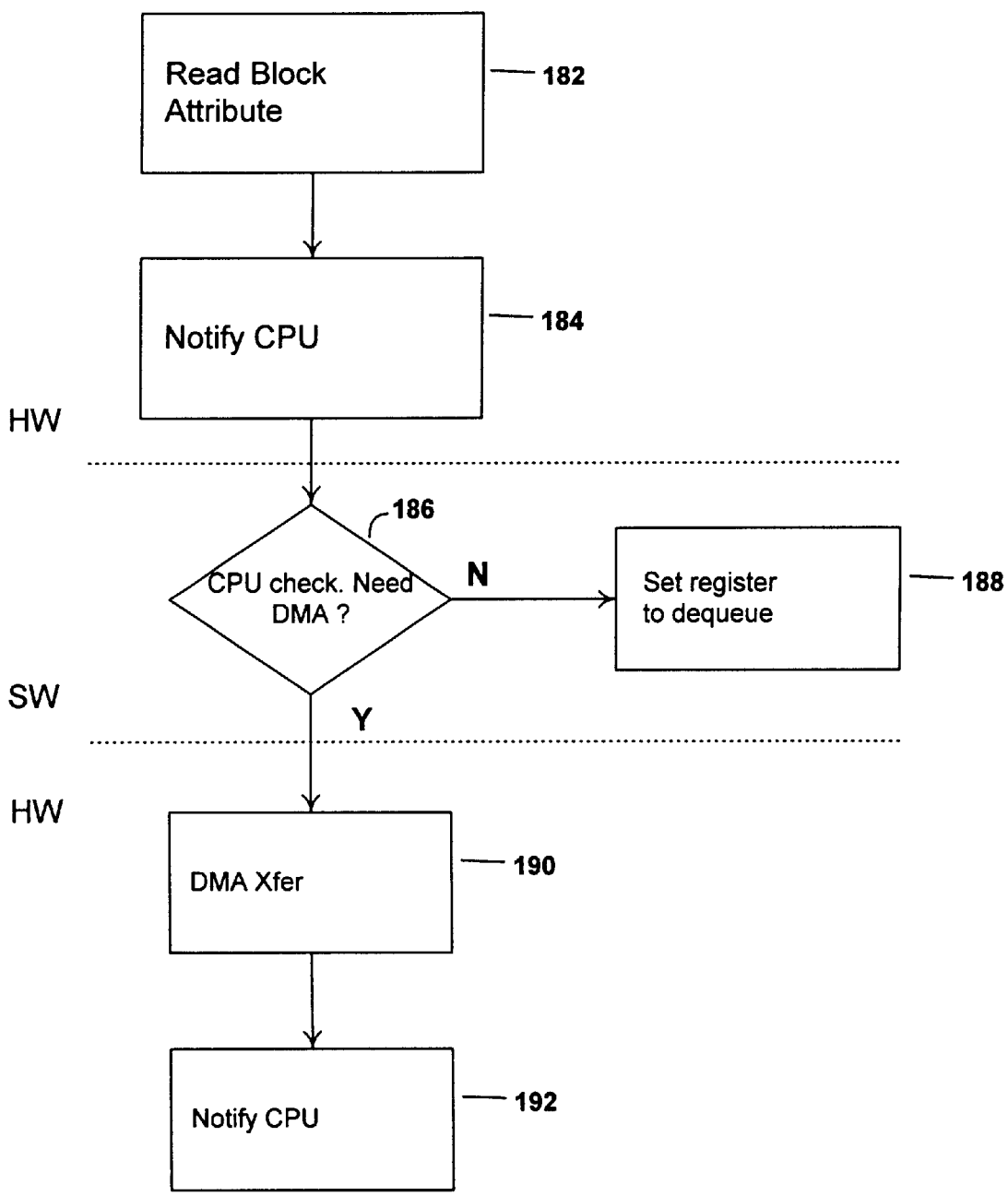
FIG. 13 is flowchart of packet memory-to-CPU operation of present embodiment.

FIG. 13 flow chart shows packet memory 16 to CPU 12 operation. Initially, in hardware, block attribute is read 182, and CPU 12 is notified 184. Then, in software, run CPU check whether DMA needed 186; if not, then set register to de-queue 188. Then, in hardware, DMA transfer 190, and notify CPU 12.

Figure 14:
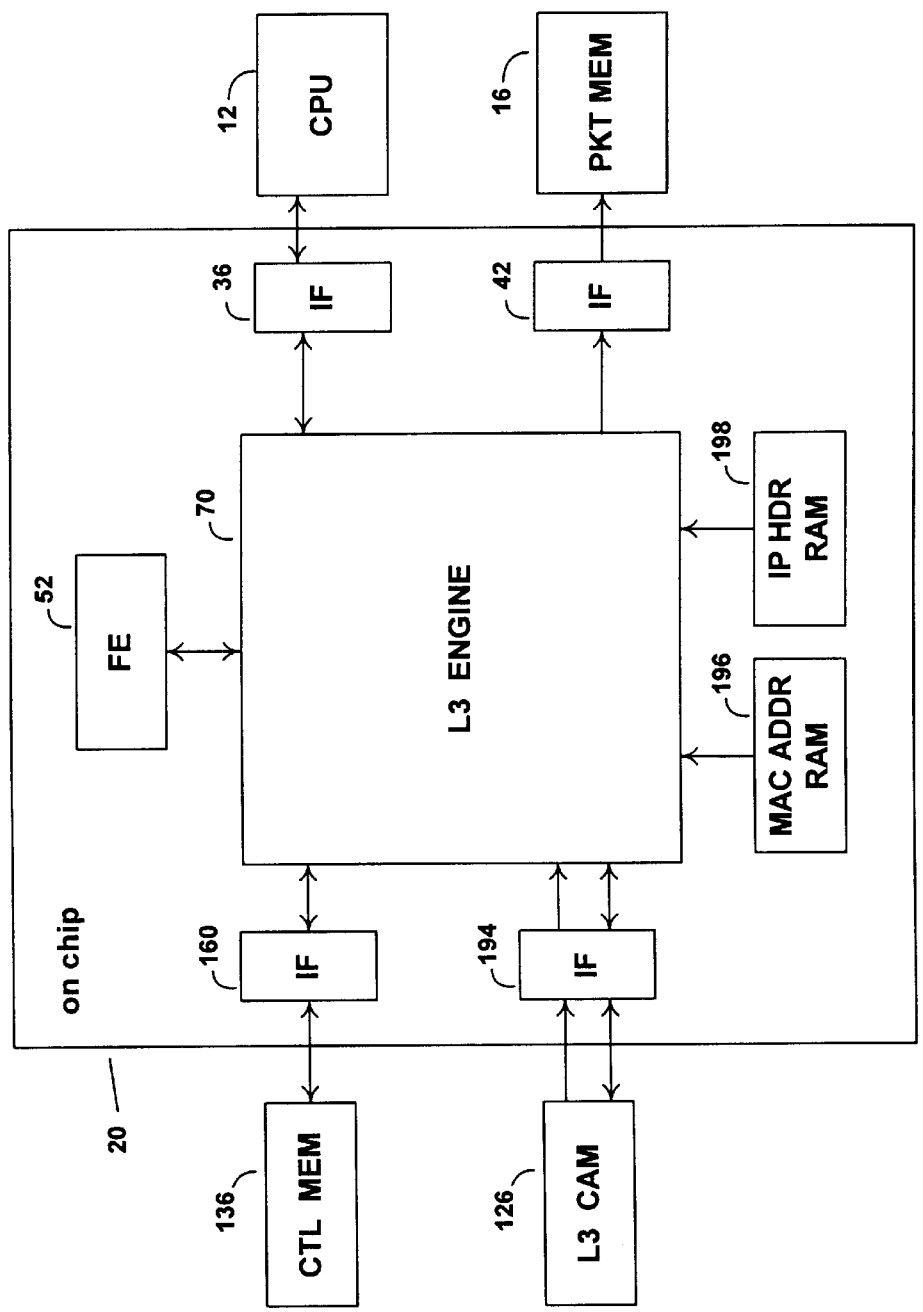
FIG. 14 is block diagram of L3 block interfaces of present embodiment.

FIG. 14 shows switch circuit 20 with L3 engine 70 coupled to FE 52, interface 36 to CPU 12, interface 42 to packet memory 16, IP header RAM 198, MAC address RAM 196, interface 194 to L3 CAM 126, and interface 160 to control memory 136.

As packet is received, L3 check block captures destination IP address, Time To Live Field and Checksum field in L3 Header Memory, for use by L3 block 70 for L3 lookup and processing. L3 check block processes rest of packet header. Receive packet is checked for IP protocol filed, and to detect packets for specialized handling.

IP header length is checked to determine whether packet needs specialized option processing. If header length is not equal to 5 32-bit words, option processing is applied to packet. Time To Live filed is checked to see if TTL field is more than 1; if less than 1, packet is marked with TTL error flag. IP packet length is checked for minimum length to contain full IP header. Checksum of header is performed.

Results of above checks are written into informational (e.g., L3 INFO) Memory. L3 INFO Memory is 32-byte wide. Each location is dedicated for corresponding numbered port. Result of L3 header checks for receiving port is stored in corresponding location and used by Forwarding Block to decide whether packet is sent to L3 Block for processing.

L3 check (e.g., CHK) block takes into consideration if arriving packet contains VLAN tag, if VLAN tag option is enabled. If so, hardware accounts for shift in appropriate fields for L3 header checking process. This amounts to 4-byte shift of L3 header following MAC header. Optionally, VLAN priority bits are extracted and passed along with L3 INFO. VLAN priority bits may be enabled to override QoS information set in L2 CAM result and L3 Header Lookup result. Programmable register is provided to load pattern to identify if incoming packet is VLAN tagged packet.

L3 Engine (L3E) 73 is hardware block for implementing the Layer 3 CAM lookup and age table functions for switch circuit 20. L3E 72 receives requests from forwarding engine (FE) 52 and CPU 12, processes requests and returns results to requester. L3E 72 lookup functions includes: receiving, buffering and processing lookup requests from FE 52; providing hardware to calculate hash index from destination IP (DstIP) address provided by FE 52; reading CAM entry at address and checking for IP address match; following linked list entries until match is found or end of list is reached; and returns lookup result to FE 52. L3E 72 age table maintenance function includes: maintaining age table in control memory 136; adding and deleting entries in table by CPU 12 request; aging table at CPU-controlled intervals; reporting aged entries to CPU; maintaining aging time stamp; and making entries live. L3E 72 CAM management assistance function includes: providing hardware hash calculation function for CPU 12; implementing search function which scans L3 CAM and reports matching entries; and providing change option to search function which writes new data into matching entries.

CPU 12 interface to L3 Engine 70 is for age table and L3 CAM maintenance. Initial CAM entries are written to L3 CAM 126 by CPU 12 through dedicated control memory interface port. Managing linked entries and free buffers is done by CPU 12. Searching for entries and reporting or changing them is accomplished by appropriate command registers.

Age table entries are created and deleted by CPU 12 using add and delete commands. Aged entries are reported to CPU 12 and deleted by CPU 12 using delete command. Time hardware modifies age table entry when entry is made.

Packet memory 16 includes 8-MB SDRAM with 4 1M×16 devices providing 32-bit data path to 4096 2KB blocks for packet storage. L3 Engine 70 writes to packet memory 16 to modify fields (e.g., destination address (DA), source address (SA), TTL and checksum) in packet following L3 lookup. DA and SA fields are written in 32-byte burst with byte enables set appropriately. MAC address RAM 196 is 32-entry RAM, indexed by port number, which contains lower byte of MAC address for each physical port.

IP HDR RAM 198 is 2-port Internet Protocol header memory RAM located on switch circuit 20. Each entry contains IP values (e.g., TTL, checksum and DST IP) for packet. Write port of RAM 198 is used by packet memory engine 90 to store data from packet IP header. As data streams to packet memory 16, appropriate bytes are pulled and written to RAM 198. L3 Engine 70 uses read port of RAM 198 to access data required to process lookup request from FE 52. Entries are indexed by port number, so receive (RCV) port number is used to lookup entry.

L3 CAM 126 is contained in 2-MBytes synchronous DRAM (SDRAM) located in single 1M×16 part. Since SDRAM is optimized for burst transfer, L3 Engine 70 accesses occur in bursts of eight 16-bit words. On-chip arbiter/controller logic for L3 CAM 126 memory has multiple ports to allow better pipelining of accesses and L3 engine 70 uses two of these ports.

L3 CAM 126 data structure is implemented as hash table combined with pool of free buffers which can be linked to entry in hash table. Entry, whether in hash table or free buffer pool, is 8 words (16 bytes). Entry is referred to by entry number, 17-bit number used when indexing CAM, when indexing into age table or when reporting results of search or aging operation.

Base hash table contains 64K entries and resides in lower 1-MByte SDRAM. Entries in table have entry numbers in 0 to 64K range, i.e. bit 16 of entry number is set to '0'. Entries located in free buffer pool are in upper 1-Mbyte of SDRAM, and entry numbers have bit 16 set to '1'. Address of first word of entry in CAM is determined by concatenating entry number with 3 bits of '0'.

CPU 12 creates entries in hash table for DstIP addresses by hashing address and using resulting 16-bit hash index as offset to entry in table. When multiple address' hash to same entry in base table, link is created to free buffer pool entry. If additional addresses hash to same location, they can be added to end of linked list. CPU 12 creates and maintains entries and manages linked list structures.

Control memory block (CTL MEM) 136 uses 128K×16 synchronous SRAM (SSRAM), instead of SDRAM devices because most data structures stored require single read and write accesses. L3 Engine 70 uses 32-KB portion of control memory to store age table. It does single read followed by single write of word in age table. Each 16-bit word contains age table information for 4 CAM entries. Aging information for particular L3 CAM 126 entry is accessed by using CAM entry number divided by 4 as address into age table.

Forwarding Engine (FE) 52 performs lookup requests to L3 Engine 70 for each IP packet to be processed. Four-deep FIFO buffer is provided to buffer these requests. FE 52 provides RCV Port Number and Block Number for each packet. After lookup is complete, L3 Engine 70 returns RCV Port Number as well as L3 Result and L3 Status word containing various flags and information from matching CAM entry.

Regarding age table support, since control memory 136 containing age table does not support locked operations, table modifications are done by hardware. Such table modifications address condition of two agents trying to modify same table entry. CPU 12 can initialize entries to invalid state at startup by writing to control memory; but during operation, hardware performs table modifications.

Age table operations are done by CPU 12 write to age command register. Write to age command register causes Age Table Busy flag in L3 Status register to be set until operation is complete. Aged entries are reported in registers (e.g., AgeResult 1&2).

Figure 15A:
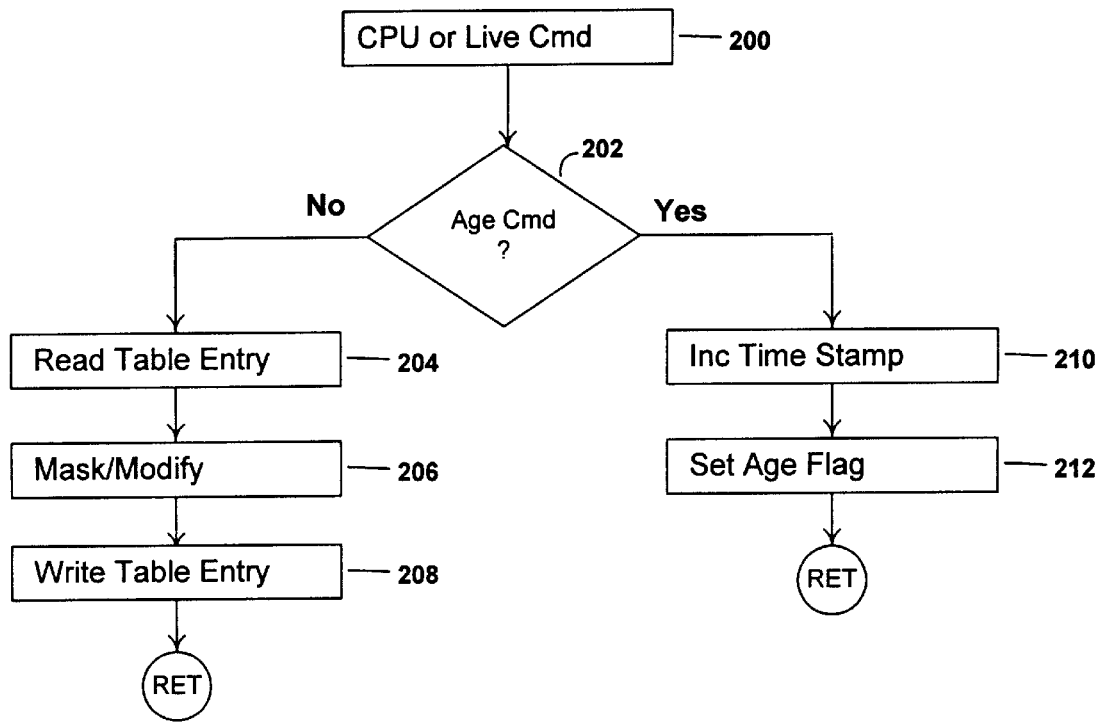
FIGS. 15A–B are flowcharts of age table maintenance of present embodiment.
Figure 15B:
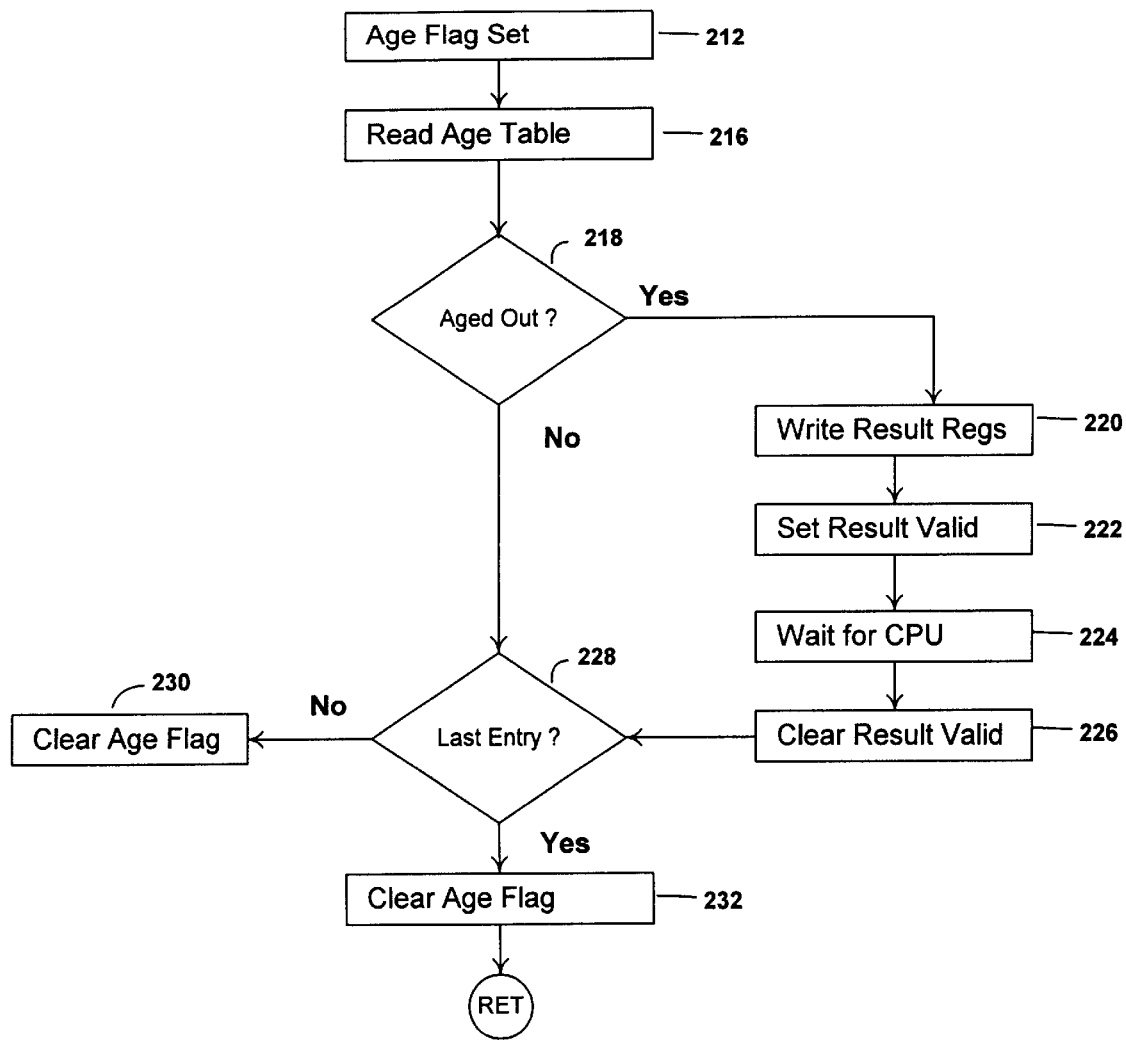

In FIG. 15A, age table maintenance is illustrated, starting with CPU or live command processing 200, then determine if age command 202 applies. If so, increment time stamp 210 and set age flag; otherwise, read table entry 204, mask and modify table entry 206, and write table entry 208. Further, in FIG. 15B, after age flag set 212, age table is read 216, then determine age out 218. If so, then write result registers 220, set result valid 222, wait for CPU 224, and clear result valid 226; otherwise determine 228 if last entry. Next, clear age flag 232, 230 and read hash table 240.

Time stamp is 2-bit value providing four age time intervals. There are two age time counters, currTime and ageTime. CurrTime is reset to zero and increments when CPU 12 issues age command. Entries with time stamps equal to this value are newest entries. AgeTime value is always equal to currTime+1 (i.e., currTime−3, modulo 4). Entries with time stamps equal to ageTime are aged next time CPU 12 issues age command.

CPU adds entry to age table when creating new entry in L3 CAM 126. Until entry is added to age table, entry does not participate in aging process. CPU 12 writes (e.g., AgeCmd) register with entry number and add or add permanent command, and hardware reads appropriate entry, modifies valid and permanent bits appropriately and writes currTime into time stamp field.

Hardware makes entry live (i.e., accessed) when L3 CAM lookup results in IP hit. Entry number of matching entry is used to access age table, and time stamp field is updated with currTime. Entries which are accessed frequently have more recent time stamp than infrequently used entries, and are not aged out.

CPU 12 deletes entry in age table when removing entry from L3 CAM 126. CPU 12 writes AgeCmd register with entry number and delete command, and hardware reads appropriate entry, clears valid bit, and writes modified entry back to table.

When CPU 12 age timer expires, CPU writes AgeCmd register to initiate aging process. This sets AgeCmd Busy bit in L3 Status register until entire table is aged. Add and delete commands can be issued, but new age commands have no affect.

When CPU writes ageCmd register, hardware increments ageTime and currTime counters and resets aging address counter to zero. Hardware reads 32K words of age table and checks if any time stamp fields are equal to ageTime. Entries with time stamps equal to ageTime are reported to CPU 12 as aged out. CPU 12 deletes aged entry from CAM and age table.

To assist CPU in managing linked CAM entries, hardware reports aged entry number and entry number of previous entry in linked list. For aged entries in base hash table, zero value is reported for previous entry. When result is posted to result registers, Age Result Valid bit is set in L3 Status register, and aging process is halted until result is read by CPU 12. Reading AgeResult register restarts aging process and clears status register bit.

First aged entry number used to access L3 CAM 126 to retrieve DstIP for entry. DstIP is hashed to locate base hash table entry and CAM entry at address is read. Hardware follows linked list, reading CAM entries until retrieving entry with Link Address equal to original aged entry number. Entry number is reported along with aged entry number in AgeResult registers.

CPU 12 provides L3 CAM management functions, including initial setup, adding entries, deleting entries and managing linked lists and free buffer pool. Hardware provides automatic search/change capability to assist CPU 12 in locating entries with certain characteristics and optionally changing such entries.

Search operations are initiated by CPU 12 write to SearchCmd register. Write to SearchCmd register causes Search Busy flag in L3 Status register to set until operation is complete. Matching entries are reported in (e.g., SearchResult) registers.

Figure 16A:
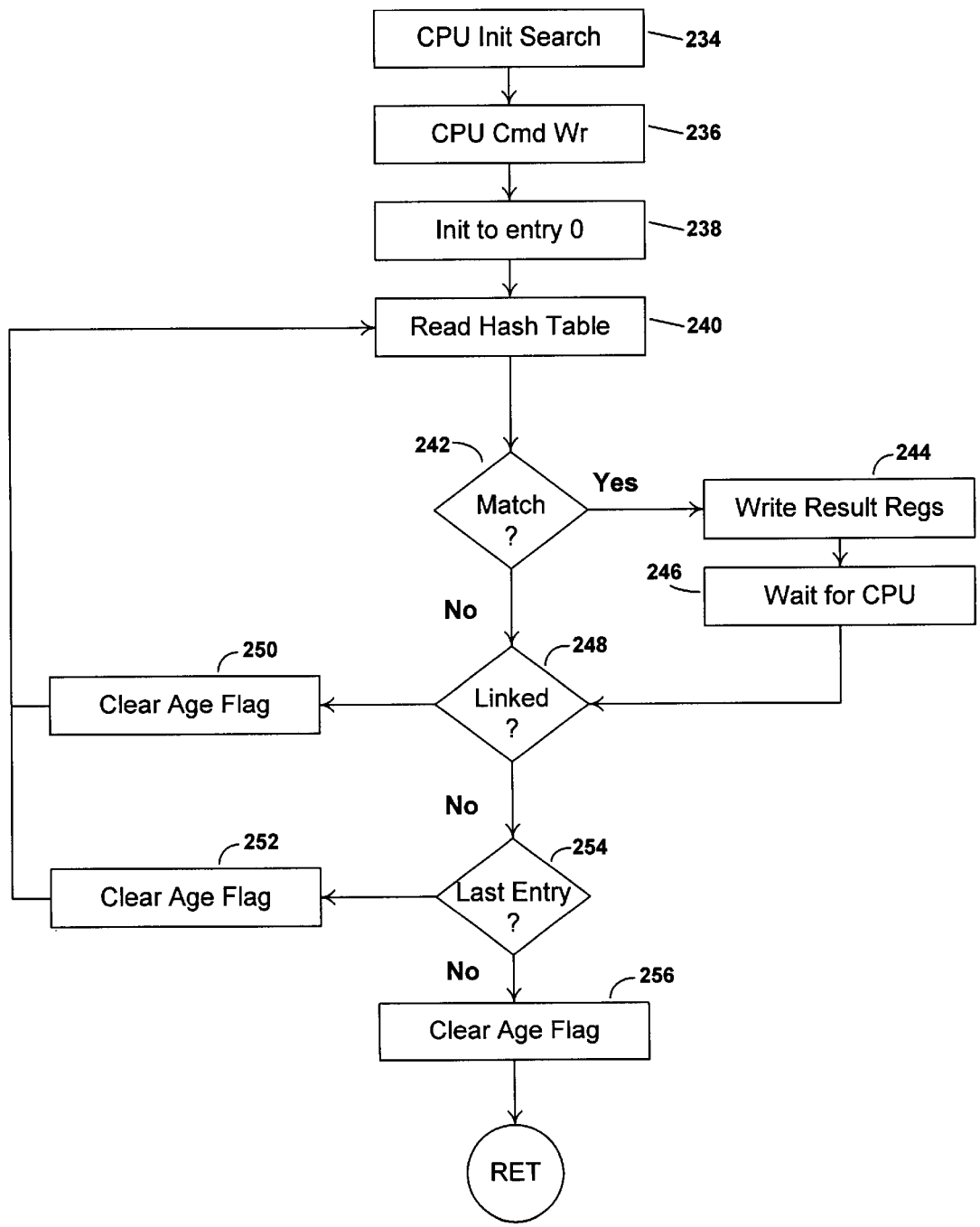
FIGS. 16A–B are flowcharts of search and lookup operations respectively of present embodiment.

FIG. 16A shows search operation steps. CPU initiates search 234, writes commands 236, initialize entry to zero 238, read hash table 240, then determine match 242. If so, write result to registers 244, and wait for CPU 246; otherwise, determine if linked 248. If so, clear age flag 250, else, determine if last entry 254. If so, clear age flag 252; otherwise, clear age flag 256.

Hardware performs automatic and exhaustive search of L3 CAM 126 when SearchCmd register is written. Starting with entry 0, each entry in base hash table is read and checked against search criteria. If entries have valid link address, then linked entries are read and checked. Minimum 64K CAM entries are read.

During search, SearchCmd can be written with Abort Flag set, and hardware exits search process. Pending SearchResults are read by CPU 12 before hardware exists and clears Search Busy flag.

For each of 8 words in CAM entry, there is corresponding (e.g., SearchMask and SearchData) registers (16 registers total). Before search command is issued, SearchMask registers are written. '0' in bit position masks bit from consideration in comparison. SearchData registers are written with data values to be matched. Registers containing data to be matched are written.

Match is indicated when all eight words of CAM entry meet following representative requirement: SearchMaskX & SearchDataX=SearchMaskX & CamDataX.

To assist CPU 12 in managing linked CAM entries, hardware reports entry number where match found and entry number of previous entry in linked list. For entries in base hash table matching search criteria, zero value is reported for previous entry. When result is posted to result registers, (e.g., Search Result Valid) bit is set in L3 Status register, and search is halted until result is read by CPU 12. Reading SearchResult2 register restarts search and clears status register bit.

As hardware searches CAM entries and follows linked lists, it stores address of previous entry in register. Entry number is reported with matching entry number in SearchResult registers.

If change option was selected when (e.g., SearchCmd) value was written, then matching entries found during search are changed by hardware according to values written to change setup registers. When matching entry is found, hardware alters data and writes back to CAM before reporting match result to CPU 12.

For each of 8 words in CAM entry, there is corresponding (e.g., ChangeMask and ChangeData) registers (16 registers total). Before search command with change option is issued, ChangeMask registers are written. '1' in bit position marks bits to be changed. ChangeData registers are written with desired new data values. Registers containing data to be changed are written.

For each match, eight words of CAM entry are changed, for example, as follows:

NewCamDataX=ChangeMaskX & ChangeDataX|~ChangeMaskX & CamDataX.

If (e.g., Don't Report) Flag is set when SearchCmd is written, then matching entries are not reported to CPU 12. Flag should not be set for search only commands.

L3 Engine receives CAM lookup requests from forwarding engine and searches matching entry in L3 CAM 126. Results of search are returned to FE 52, and additional requests are serviced.

Figure 16B:
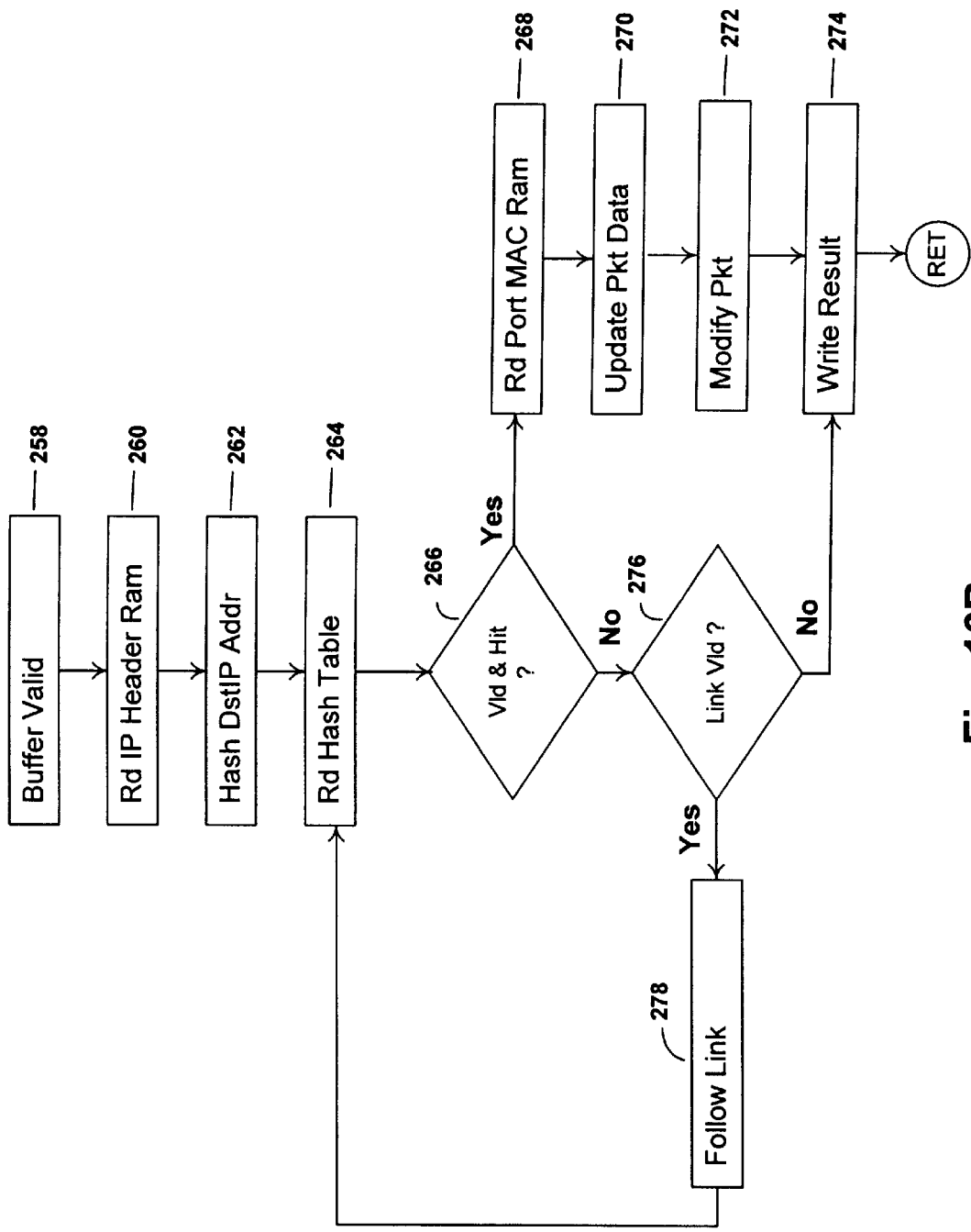

In FIG. 16B, flow chart shows CAM lookup steps. Initially, valid buffer is set 258, read IP header RAM 260, hash destination IP (DstIP) address 262, and read hash table 264, then determine if valid and hit 266. If so, read port MAC RAM 268, update packet data 270, modify packet 272, and write result 274. If not, determine valid link 276. If so, follow link 278 and read hash table 264, else write result 274.

L3 Engine 70 buffers up to 4 lookup requests from forwarding engine (FE) 52. When buffer is full, busy signal is sent to FE 52. Buffer is organized as FIFO and contains receiving port number and block number for lookup request.

When valid request exists in buffer, hardware begins lookup process. First buffered request is read, and receive port number for that request is used to access IP header RAM and retrieve packets DstIP address.

32 bit DstIP address is hashed to 16-bit value which is used as entry number for base hash table. That entry is read, and words containing DstIP address are compared to packets DstIP address. If these two addresses match, then IP hit bit is set, and results of successful lookup are returned to FE 52.

Before result is posted to FE 52, packet may be modified, depending on bit in L3 Flags field of CAM entry. If Don't modify bit of CAM entry is set, nothing is changed in packet. Otherwise, when lookup is successful, TTL field of IP header is decremented and modified in packet memory, and (e.g., CheckSum) field is recalculated and changed. Packets DA is overwritten with value contained in matching CAM entry, and SA is replaced with value from MAC Address Registers and MAC Address RAM.

Whenever IP addresses don't match or CAM entry is not valid, hardware checks Link Valid field of entry to see if entries with same hash index exist. If link valid bit is set, each entry in linked list is read and checked for matching IP address until hit occurs or end of list is reached.

If match is not found in L3 CAM 126, hardware checks to see if default route registers are written by CPU. These registers provide 'default route' CAM entry and are programmed with same information as CAM entries in control memory 136. If default route exists, then packet is modified using default information, and (e.g., IPHit and DefaultRouteUsed) bits of L3 Result are set.

Upper bits of MAC address for ports are provided in three registers. Three 16-bit registers provide full 48-bits address, but lower byte of address for each port is provided by MAC Address RAM 196.

MAC Address RAM 196 contains lower byte of MAC address for each port. It is 32×8 dual port ram which is written by CPU 12 and read by hardware during packet modification. This value replaces lower byte from MAC Address Registers when writing new SA for packet.

L3 results of CAM lookup returned to FE include receive port number and block number originally provided by FE 52 and two 16-bit values, L3 Result and L3 Status. A detailed bit definition for these last two values was provided earlier in this document.

Switch circuit 20 operates on various performance and integrity levels. In cut-thru switching mode, relatively fast ether switching mode and high performance level are achieved; however, there is possibility of transmitting packet with error during receive process. In this mode, CPU programs MACs to raise receive request when collecting 64 bytes. Also it programs MAC to raise subsequent receive request after every 64 bytes collection. First request provides fast header analysis and switching.

In store forward (SF) mode, receiving packet is not sent to port until reception is complete. Switch circuit 20 waits until packet completion and updates transmit queues of relevant destination. MAC programming remains same. Forwarding Block acts on 'store forward mode' mode on port by port basis. SF mode is selectable as per port basis. In this mode port linking is disabled.

In preferred embodiment, packet moves in following directions: received on LAN port(x) and transmitted to any/all other LAN ports; received on LAN port(x) and posted to UL queue; received on LAN port(x) and posted to CPU queue; received on LAN port(x) and packet dropped; and forwarded from CPU to any/all LAN ports. In each case, packet flows through packet memory 16 and switch circuit 20. In each case, switch circuit 20 participates in forwarding, filtering and queue management.

In case of Ethernet port originated packet flow, packet is received on Ethernet ports, and switch circuit 20 is triggered on such packet from request from one of MACs. This is hardware trigger mode. Switch circuit 20, in coordination with RISC processor 12, allocates free block pulled from receive free list. Once block is assigned, block is busy until destination agent(s) complete transmission. Transmission completion has mechanism to release block and insert in receive free list.

To identify packet destination, switch circuit 20 needs to obtain packet header information. Header is extracted from MAC received data stream. Here, PM engine 90 identifies header from data stream and loads on port-specific segment of Ether header memory. CAM Processor makes lookup on CAM and delivers result to Auto Forwarding Block. AFB adds packet to one of following queues: one of Ethernet ports transmit queue; all Ethernet ports queues, UL transmit queue and CPU queue; UL queue; CPU queue; or L3 block for L3 lookup.

AFB handles updating "Block address", "Byte count", and "routing information" on transmit queues. Once such information is provided, respective transmitting agents handle packet transmission. At end of transmission, block is released and added to receive free list. Refer for more details about releasing the block in some other sections.

CPU 12 posts packets to XQMB 154 of Auto Forwarding Block for transmission to one or several ports. XQMB 154 handles posting packet to respective queues. Prior to request, CPU 12 assembles or modifies existing packet in packet memory 16 for transmission. CPU 12, with help of DMA function, can transfer packet from local memory 100 to packet memory 16, and at end of such transfer, can initiate XQMB 154 action.

Figure 17:
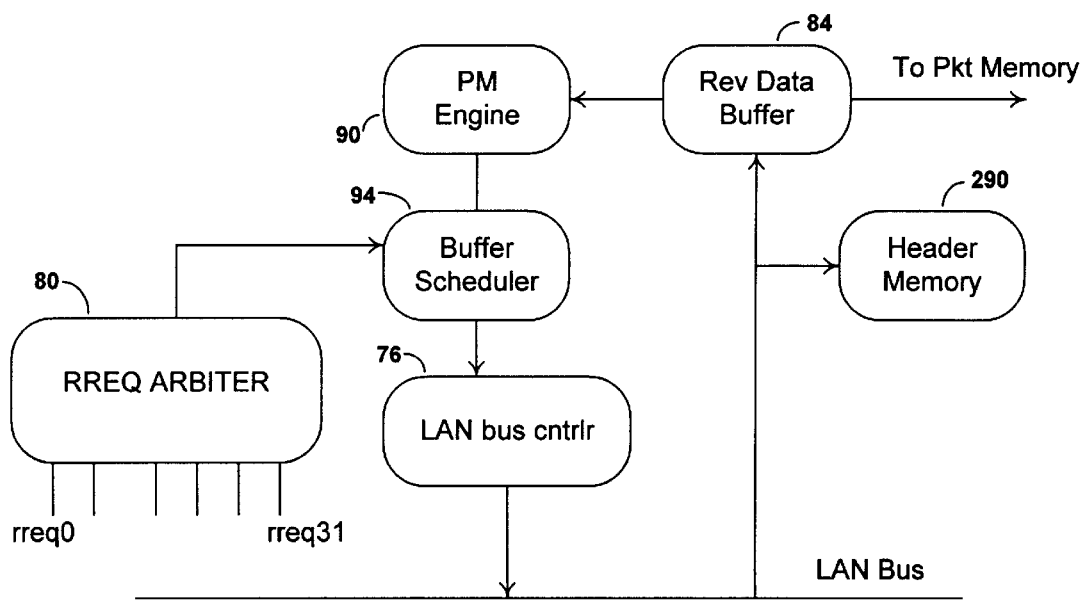
FIG. 17 is flowchart of packet reception of present embodiment.

FIG. 17 shows packet receive process, which is accomplished by Receive Arbiter 80, Buffer scheduler 94, LAN bus controller 76, Packet memory engine 90, header memory 290, data buffer 84, as well as Auto Forwarding Block (AFB) and PM SDRAM controller. Such modules work concurrently.

Receive arbiter 80 arbitrates and prioritizes receive request from Ether ports. It raises request to buffer scheduler 94. When request is under process, arbiter 80 makes background processing on remaining requests.

Buffer scheduler 94 handles resource allocation of internal buffers. Buffer scheduler 94 maintains two receive buffers and two transmit buffers 84. Each buffer can hold up to 64 bytes of data, and optimizes buffer allocation algorithm for fair bandwidth extraction between receivers/transmitters.

LAN Bus Controller 76 interfaces to LAN bus to read/write packet data to MAC FIFO buffers, and access MAC receive completion status. LAN bus controller 76 may access MAC and read data slice, and store to internal data buffer. A data buffer can hold up to 64 bytes of information.

Packet memory engine 90 sets-up moving packet in slice-by-slice into PM 16. Packet memory engine 90 reads PM receive block register and byte count register, and updates (i.e., increments) byte count register on each transfer. Packet memory engine 90 commands PM SDRAM controller to start data transfer. PM SDRAM controller transfers data from receive buffer to packet memory 16, and generates control timing to access external SDRAM.

Auto Forwarding Block allocates free block to receiver; initializes receive block register, byte count register. Occasionally AFB commands to reject packet.

After reset, if (e.g., AUTO_INIT_STRT) sense bit is cleared, (e.g., RCVR_INIT) receiver initialize block in FE 52 waits for (e.g., INIT_STRT) initialize start bit to be set. When bit is set, then using (e.g., PORT_ES_STS) information, which tells receive ports to be initialized, active receive ports are initialized with free block.

Every LAN MAC has (e.g., RREQx) receive request signal which, when active, including at least 64 bytes of data (i.e., header/data region) is collected in internal FIFO. There are 32 request signals from LAN bus. Following steps describe new packet reception and header memory loading:

1. When new packet starts in Port-x, RREQx signal becomes active, indicating 64 bytes valid in FIFO. Request active and (e.g., RBODYx) bit clear means new packet.
2. RREQx signal is first-level conditioned if corresponding bit enabled in Receive Enable register. When RISC 12 allocates free block to receive port, it writes block address on corresponding receive block register and enables the receiver". Conditional RREQx first wins RREQ arbitration to get service.

3. When RREQx wins arbitration, scanner freezes on port number x and request service to buffer scheduler 94.
4. Buffer scheduler 94 allocates one of two free receive data buffer and enables LAN bus controller 76 to start data transfer.
5. LAN bus controller 76 executes Burst Read Accesses on LAN bus targeted to Port-x. Read data is written on allocated internal receive buffer. Since body bit is clear, loading process signatures slice as "header". If slice is header, it writes header data on 2-port Ether Header memory. At end of header loading, Port to be Analyzed FIFO is loaded with 5-bit port number. Loading of FIFO enables CAM engine to start analyzing header information. Load completion calls attention of PM engine for data movement from receive data buffer to packet memory 16.
6. PM engine 90 updates byte count and sets-up SDRAM Controller for data transfer to packet memory 16.
7. Buffers have dedicated channels to SDRAM Controller. SDRAM Controller arbitrates transfer requests amongst channels and starts executing request at time overlapping address and data phases to maximize throughput and efficiency. Requesting channel is held arbitrating for LAN bus until full slice is moved in packet memory 16.

Packet data reception procedure, similarly to MAC RREQx signal which, when active informs at least 64 bytes data, is collected in internal FIFO, as follows:
1. When body bit for Port(x) is set, and RREQx signal is active, 64 bytes are valid in FIFO.
2. RREQx signal is first-level conditioned if corresponding bit is enabled in Receive Enable register. Conditional RREQx first wins the RREQ SCAN arbitration to get the service.
3. When RREQx wins arbitration, scanner freezes on port number, (x) and requests service to buffer scheduler 94. Along with this request, RBODYx bit indicates if packet is in middle of reception.
4. Buffer scheduler 94 allocates free receive data buffer 84 and alerts LAN bus controller 76.
5. After acquiring LAN bus, LAN bus controller 76 executes burst-read accesses on LAN bus targeted to Port-x. Read data is written in allocated receive buffer 84.
6. When data loading is completed on data buffer, loaded data buffer is signatured as "non header". LAN bus controller 76 continues scan for next request in queue. Loaded data buffer draws attention of PM engine 90 to load to PM 16.

When processing in unswitched environment, (e.g., Rec Link) receiver link register(x) indicates accordingly. Link bit cleared means slice is non-switch mode presently. Loaded data buffer calls attention of PM engine 90 to load data into packet memory 16. PM engine 90 uses the Receiver Block Address register(x) and Receiver BC register(x) to construct PM destination address. It leaves updated byte count in Rec BC register(x) for future reference. PM engine issues command to PM SDRAM controller to start data transfer and ready to service receive or transmit buffer or accept command.

When processing in switched environment, Rec Link register(x) indicates accordingly. If link bit is set, slice is in switch mode for present slice and consecutive slices until end of packet. Loaded data buffer calls attention of PM engine 90 to load data into packet memory 16. PM engine 90 uses Receive Block Address register(x) and Receive BC register(x) to construct PM destination address. Byte count is updated in receive BC register(x) and transmit BC register (y). PM engine issues command to PM SDRAM controller to start data transfer and ready to service receive or transmit buffer or accept command.

Forwarding Engine (FE), in coordination with CAM Processor and L3 Lookup Block, evaluates current receiving packet for following possible decisions: reject packet; link packet; forward packet to transmitter queue; multicast packet to two or more ports; broadcast packet only to Ether ports; broadcast packet to Ether ports and UL; send packet to UL; send packet to CPU; or send packet to L3 Lookup Block for L3 analysis.

In packet forwarding mode, CAM Processor writes decision information into header analyzed FIFO. Such write process wakes-up Forwarding Block to take-up forwarding process. PM engine 90 keeps loading successive slices of packet in packet memory 16 independent of CAM analysis. Decision of CAM might occur at middle of packet reception or after end of packet reception. If header analysis is complete before packet reception is complete, Forwarding Block acts on packet if packet is unicast or destination is L3 Lookup Block which carries on further analysis associated with L3 forwarding. For other cases, Forwarding Block is not called to action until receive completion of packet. If packet reception is complete before header analysis, Forwarding Block is not called into action until header analysis is complete. Receiver is not primed again until forwarding decision has been taken on received block and acted upon.

In packet rejection mode, when CAM engine or Forwarding Block decides not to receive packet, control bit is set for corresponding receiving port to reject incoming packet. PM engine 90 looks at reject bit to set prepare for transfer from receive buffers to packet memory. If reject is set, PM engine 90 empties FIFO without setting transfer to PM. PM engine 90 clears reject bit at end of packet reception. Receive complete state is indicated to Forwarding Block.

In packet switching mode, CAM lookup posts port number in CAM Analysis Done FIFO in addition to setting CAM analysis done bit for port. This draws attention of Forwarding Block prior to completion of packet reception. Forwarding Block checks several conditions to take forwarding action. At this time, it may link packet to corresponding transmitter or post packet in queue of transmitter.

Transmitter may be busy, i.e., transmitter queue contains one or more packets queued or transmitter is currently processing old packet. Forwarding Block requests XQMB 154 to post receive packet in transmitter queue with incomplete information. This is handled by manipulating RC bit clear in BC entry in control memory 136. Bit, if clear, means packet block address is valid, but byte count is invalid. Packet data is incomplete in packet memory 16. Forwarding Block pushes incomplete packet in transmitter queue on special occasion. When, receiver(x) wants to switch to transmitter and if transmitter is currently busy, Forwarding Block puts packet in transmitter queue to maintain order of priority. At pushing event, byte count information is invalid. If transmitter finishes old packet, and receiver/packet falls as next packet in transmitter queue, and receiver has not completed full reception, then XQMB 154 commands to link. If receiver completes packet before getting to transmitter, Forwarding Block sets such bit, and loads valid BC value on BC entry. Subsequent forwarding action on packet degenerates to store and forward mode.

Transmitter may be free when switching decision occurs. Forwarding Block commands to link receiver to transmitter. It does not manipulate control memory structure. At receive packet completion, Forwarding Block primes receiver, and transmitter continues to transmit until end of packet without further intervention. Finishing transmitter event releases block and pushes to receive free list.

Forwarding Block may act on receive packet after receive completion and CAM analysis completion. Since packet is received, XQMB 154 is instructed to post on appropriate transmitter queue; this is Store and Forward mode.

Broadcasting to Ether ports decision may result from not finding destination port or hit on broadcast MAC address. Depending on nature of broadcast decision, broadcast map for receiving port is fetched, and packet is forwarded to transmit queue management block for posting on transmit queues In sending packet to uplink or processor 12, header analysis results in port not physically connected to LAN ports, but CPU or uplink ports; Forwarding Engine Block instructs XQMB 154 to queue on appropriate ports. XQMB 154 may queue packet on ports if ports are specified in broadcast port map.

When end of packet is sensed from LAN port(x), LAN controller signals by bit in slice status. PM engine 90, while moving slice to PM 16, notifies same status by setting appropriate bit in Rec end reg. Forwarding Block acts on every receive completion; and in addition to forwarding actions, it instructs Free Queue Management Block to prime receiver. In case previous packet is rejected, no new block needs to be allocated; in such case it enables receiver to receive new packet.

For packet transmission, transmit port activity is top-level enabled by Forwarding Block or Transmit Queue Management Block of Auto Forwarding Block.

In stored packet mode from transmit queue, XQMB 154 picks highest priority packet, and loads transmit block address register and byte count register corresponding to packet. This action enables transmitter on transmit enable register.

In cut-thru mode for linking, Forwarding Block or XQMB 154 loads link command with which hardware copies receiver block address to transmitter block address register. It copies current running receiver rec(x) byte count value to transmitter(y) byte count register. It also sets link bit active.

Transmitter enters arbitration if transmit (e.g., XMT) enable bit is set, and Byte count validity is met. If MAC transmit FIFO has at least 64 bytes free space, it raises TREQ# signal. This signal is conditioned with first phase enable signal, and transmitter enters arbitration with other TREQ# signals asserted by other transmitters. Winning transmitter requests allocation of one of two free transmit buffers. This request is forwarded to buffer scheduler. When buffer scheduler allocates free buffer, transmitter enters arbitration for PM engine 90 service. PM engine 90 time-multiplexes between receive requests and transmit requests and other commands such as link, receive enable and transmit enable.

PM engine 90 moves sets-up transfer with PM SDRAM controller by giving command to move slice from PM to data buffer, and updates byte count and address registers in array for corresponding transmitter.

PM engine 90 signatures slice as header or non-header based on XMT body bit. Along with slice, PM engine 90 passes information, such as slice count and port address through buffer attributes. Loaded slice calls attention of corresponding LAN controller for service to transfer data from transmit buffer to MAC on LAN bus. LAN controller moves slice to target MAC port and releases buffer. Whenever PM engine 90 moves slice, decremented byte count is compared, to check, if reached zero. If reached zero, packet may reach end of packet status based on following cases:

If case is non-linked, packet was originally fully received. Byte count loaded at time of enable was actual byte count of packet. Link bit clear indicates end of packet.

If packet is in linked state, transmitter byte count reaching zero is not regarded as end of packet; it is regarded as transmitter has to wait for receiver to get slice. Transmitter does not participate in arbitration again until slice is received on linked receiver. Link bit clear and byte count zero signal packet completion.

PM Engine clears XMT enable bit, and sets End of packet transmit bit. End of transmit draws attention of XQMB 154 to look at transmitter queue in control memory 136. If queue contains additional packets, XQMB 154 loads new packet to re-enable transmitter. If queue is empty, XQMB 154 does not take action. Trigger point for enabling transmitter is: when current packet ends, and new packet is pending in queue; when receive packet is targeted to transmitter and queue is empty; or when CPU inserts packet to transmitter.

Foregoing described embodiments of invention are provided as illustration and description. It is not intended to limit invention to precise form described. Such described specification contemplates that inventive functionality may be equivalently implemented in software, firmware, hardware, and/or other functionally comparable or equivalent electronic digital processing system or circuit made available to one of ordinary skill in the art. Other variations and embodiments are possible in light of above teaching, and it is thus intended that scope of invention not be limited by detailed description, but rather by claims as follow.

We claim:

1. A multi-level packet switching system comprising:

at least two first-level switches for packet reception or transmission, each first level switch comprising an integrated switch module that enables multi-layer switching and a processing module coupled to the integrated switch module; and a second-level switch comprising a cross-bar switch coupled to a multi-protocol router, said second level switch also coupled to each of the first-level switches for enabling packet communication between the second-level switch and the first-level switches; wherein:

each of said first and second-level switches are configured to determine which of Layer-2 switching and Layer-3 routing needs to be performed based on a Layer-2 lookup of packets received by the switching system and then perform wire-speed routing at Layer-3 and wire-speed switching at Layer-2 according to the Layer-2 lookup;

said wire-speed routing and said wire-speed switching are performed at the same time;

said integrated switch module comprises, a receive block configured to receive packets from a network communication medium;

a content addressable memory (CAM) containing Layer-2 routing information;

a CAM interface coupled to said receive block and configured to, retrieve header address information from packets received by said receive block, lookup Layer-2 information stored in said CAM based on the retrieved header address information, and identify whether the packet associated with the retrieved header address information requires Layer-2 switching or Layer-3 routing based on the Layer-2 information;

a forwarding engine, coupled to said CAM interface and said receive block, configured to direct each of said Layer-3 routing and Layer-2 switching to be performed on the received packets based on said identification;

said processing module includes programming for CAM header processing that assists in source lookup, source port read, and source learning; and said source learning comprises a process for learning Media Access Control (MAC) addresses and parts of data packets arriving from Ethernet ports coupled to the corresponding first level switch and applying the learned addresses and parts in said source lookup and said source port read.

2. The multi-level packet switching system according to claim 1, wherein:

said multi-level packet switching system is embodied on at least one Application Specific Integrated Circuit (ASIC) including a Reduced Instruction Set Computer (RISC) processor and software that enables said Layer-2 switching, and Layer-3 routing, and Layer-2 lookup of received packets;

said multi-level packet switching apparatus includes a memory module that stores said software; and said RISC processor and software comprising said processing module.

3. The multi-level packet switching system according to claim 2, further comprising:

a Layer-2 module comprising said Layer-2 lookup and said integrated switch module, said Reduced Instruction Set Computer (RISC) processor, and said software configured to effectively enable Layer-2 packet switching;

a Layer-3 module comprising said Layer-3 lookup module, said integrated switch module, said RISC processor, and said software configured to effectively enable Layer-3 packet routing; and a data path module;

wherein said Layer-2 lookup determines Layer-2 switching and Layer-3 routing to be performed on packets received by said system; and said Layer-2 module and said Layer-3 module respectively perform processing required for each of Layer-2 switching and Layer-3 routing independently and in parallel based on said Layer-2 lookup.

4. The multi-level packet switching system of claim 3, wherein:

said forwarding engine configured to direct one of Layer-2 switching and Layer-3 routing of packets received by said system based on the Layer-2 lookup of each packet.

5. The multi-level packet switching system of claim 3 wherein the Layer-3 module includes:

a hash look-up module for accessing a hash table containing Layer-3 routing information.

6. The multi-level packet switching system of claim 5 wherein the hash look-up module further modifies a packet received by said multi-level packet switching system.

7. The multi-level packet switching system of claim 5 wherein the hash look-up module further modifies an age flag in an aging table.

8. The multi-level packet switching system of claim 5 wherein the hash look-up module further manages a packet queue.

9. The multi-level packet switching system of claim 5 wherein the hash look-up module further processes packet attributes.

10. The multi-level packet switching system of claim 3 wherein the datapath module comprises:

a set of pipeline buffers coupled to said Reduced Instruction Set Computer (RISC) processor and configured to receive write data from the RISC processor;

a state machine configured to coordinate operation of the pipeline buffers, including a buffer scheduler module for scheduling the pipeline buffers.

11. The multi-level packet switching system of claim 10 wherein the memory module includes a Direct Memory Access (DMA) module for effectively enabling DMA access to the memory module.

12. The multi-level packet switching system of claim 2 wherein the memory module comprises:

a local memory, a control memory, a cache memory, or a packet memory.

13. The multi-level packet switching system according to claim 2, wherein:

said Application Specific Integrated Circuit (ASIC) includes said at least two first-level switches, and said second-level switch; and each of said first level switches include,
a Reduced Instruction Set Computer (RISC) processor interface coupled to said RISC processor,
said forwarding engine coupled to said receive block which comprises a LAN Bus receiving device,
said CAM interface further coupled to said RISC Processor,
a layer 3 lookup module coupled to the RISC processor and said forwarding engine, and
a Q management and scheduler, coupled to said RISC processor and a LAN Bus transmit device, and configured to transmit received packets according to the Layer-2 and Layer-3 operations performed by said multi-level packet switching apparatus.

14. The multi-level packet switching system according to claim 13, wherein said Reduced Instruction Set Computer (RISC) processor is at least a 32-bit Million Instructions Per Second (MIPS) RISC processor having a multiplexed bus.

15. The multi-level packet switching system of claim 1 wherein the integrated switch module comprises:

an integrated single-chip circuit for effectively enabling packet traffic broadcasting.

16. The multi-level packet switching system of claim 1 wherein:

said first-level switch is coupled to at least one hub.

17. The multi-level packet switching system according to claim 1, wherein said Layer-2 switching and said Layer-3 routing are performed simultaneously at wire-speed.

* * * * *